US011353264B2

(12) United States Patent
Harada et al.

(10) Patent No.: US 11,353,264 B2
(45) Date of Patent: Jun. 7, 2022

(54) BLOCKING PREVENTION DEVICE FOR GASIFICATION MELTING SYSTEM AND BLOCKING PREVENTION METHOD FOR GASIFICATION MELTING SYSTEM

(71) Applicant: MITSUBISHI HEAVY INDUSTRIES ENVIRONMENTAL & CHEMICAL ENGINEERING CO., LTD., Yokohama (JP)

(72) Inventors: Tomohiro Harada, Yokohama (JP); Hiroshi Oonuki, Yokohama (JP)

(73) Assignee: MITSUBISHI HEAVY INDUSTRIES ENVIRONMENTAL & CHEMICAL ENGINEERING CO., LTD, Yokohama (JP)

( * ) Notice: Subject to any disclaimer, the term of this patent is extended or adjusted under 35 U.S.C. 154(b) by 294 days.

(21) Appl. No.: 16/607,864

(22) PCT Filed: Apr. 27, 2018

(86) PCT No.: PCT/JP2018/017188
§ 371 (c)(1),
(2) Date: Oct. 24, 2019

(87) PCT Pub. No.: WO2018/199288
PCT Pub. Date: Nov. 1, 2018

(65) Prior Publication Data
US 2020/0191487 A1 Jun. 18, 2020

(30) Foreign Application Priority Data
Apr. 28, 2017 (JP) .............................. JP2017-090788

(51) Int. Cl.
*F27D 25/00* (2010.01)
*F23G 5/50* (2006.01)
(Continued)

(52) U.S. Cl.
CPC ............. *F27D 25/008* (2013.01); *F23G 5/50* (2013.01); *F23J 1/08* (2013.01); *F27D 21/02* (2013.01); *F27D 2021/026* (2013.01)

(58) Field of Classification Search
CPC ...................................................... F27D 25/008
See application file for complete search history.

(56) References Cited

U.S. PATENT DOCUMENTS 5,110,365 A * 5/1992 Carter ................ G01N 21/8422
134/113
5,338,489 A * 8/1994 Jung ....................... C01B 3/363
252/373
(Continued)

FOREIGN PATENT DOCUMENTS

JP     H09-264524 A    10/1997
JP     2000-065479 A   3/2000
(Continued)

OTHER PUBLICATIONS

PCT/ISA/210, "International Search Report for International Application No. PCT/JP2018/017188," dated Jun. 26, 2018.
(Continued)

*Primary Examiner* — Nathaniel Herzfeld
(74) *Attorney, Agent, or Firm* — Manabu Kanesaka; Benjamin Hauptman; Kenneth Berner

(57) ABSTRACT

A blocking prevention device for a gasification melting system combusts and melts an object to be treated into a slag in a melting furnace after the object to be treated is converted into pyrolysis gas in a gasification furnace, the blocking prevention device including: a slag adhesion prevention device having a slag adhesion prevention capability for preventing adhesion of the slag at an opening part that may be blocked due to the adhesion of the slag; an imaging device that images the opening part; and a control device including a calculation unit that calculates a change rate of (Continued)

an opening area of the opening part using a plurality of images with different capturing times or a video, captured by the imaging device, and a prevention device control unit that changes the slag adhesion prevention capabilities of a plurality of the slag adhesion prevention devices in accordance with the change rate.

14 Claims, 14 Drawing Sheets

(51) Int. Cl.
*F23J 1/08* (2006.01)
*F27D 21/02* (2006.01)

(56) References Cited

U.S. PATENT DOCUMENTS

| | | | | |
|---|---|---|---|---|
| 5,545,238 | A * | 8/1996 | Brooker | C10J 3/466 |
| | | | | 252/373 |
| 2004/0163969 | A1 * | 8/2004 | Breen | G01N 25/18 |
| | | | | 205/725 |
| 2004/0237861 | A1 * | 12/2004 | Azuma | F23G 5/027 |
| | | | | 110/344 |
| 2012/0167543 | A1 * | 7/2012 | Iida | F23J 1/00 |
| | | | | 60/39.12 |
| 2012/0292523 | A1 * | 11/2012 | George | G01B 15/00 |
| | | | | 250/395 |
| 2015/0285559 | A1 * | 10/2015 | Nagai | C10J 3/00 |
| | | | | 348/83 |

FOREIGN PATENT DOCUMENTS

| | | | |
|---|---|---|---|
| JP | 2000-257839 | A | 9/2000 |
| JP | 2000-292065 | A | 10/2000 |
| JP | 2001-019975 | A | 1/2001 |
| JP | 2002-147731 | A | 5/2002 |
| JP | 2002-295824 | A | 10/2002 |
| JP | 2003-294219 | A | 10/2003 |
| JP | 2004-301428 | A | 10/2004 |
| JP | 2006-118744 | A | 5/2006 |
| JP | 2011-064414 | A | 3/2011 |
| JP | 2013-217641 | A | 10/2013 |
| JP | 2020-094777 | A | 6/2020 |

OTHER PUBLICATIONS

PCT/ISA/237, "Written Opinion of the International Searching Authority for International Application No. PCT/JP2018/017188," dated Jun. 26, 2018.

* cited by examiner

BLOCKING PREVENTION DEVICE FOR GASIFICATION MELTING SYSTEM AND BLOCKING PREVENTION METHOD FOR GASIFICATION MELTING SYSTEM

RELATED APPLICATIONS

The present application is National Phase of International Application No. PCT/JP2018/017188 filed Apr. 27, 2018, and claims priority from Japanese Application No. 2017-090788, filed Apr. 28, 2017, the disclosure of which is hereby incorporated by reference herein in its entirety.

TECHNICAL FIELD

The present invention relates to a blocking prevention device for a gasification melting system and a blocking prevention method for a gasification melting system.

Priority is claimed on Japanese Patent Application No. 2017-090788, filed Apr. 28, 2017, the content of which is incorporated herein by reference.

BACKGROUND ART

Conventionally, gasification melting systems are known as techniques in which waste, such as incombustible trash, incineration residue, and sludge, including municipal waste, can be treated. The gasification melting systems include a gasification furnace that pyrolyzes and gasifies the waste, and a melting furnace that is provided downstream of the gasification furnace, combusts pyrolysis gas generated in the gasification furnace at a high temperature, and melts an ash component in the gas into a molten slag.

In order to recycle the waste, reduce the volume of the waste, and make the waste harmless, the gasification melting systems take out the slag from the melting furnace, and reuse the slag as civil-engineering materials, such as a roadbed material. The gasification melting systems recover waste heat from the exhaust gas discharged, and perform power generation.

The slag discharged from the gasification melting systems is a fluid in a state where the slag is sufficiently superheated due to the heat of the melting furnace. However, solidification tends to occur if the properties of the ash component fluctuate or the temperature within the melting furnace drops transitionally. For that reason, there is a concern that adhering substances, such as the slag, may adhere to a slag outlet of the melting furnace and the slag outlet may be blocked.

In order to prevent the blocking of the slag outlet, Patent Document 1 discloses a method in which a camera that images a slag outlet is provided and a blocked situation of the slag outlet is determined on the basis of an image captured by the camera. In the method according to Patent Document 1, in a case where the slag outlet is determined to be blocked, the blocking is eliminated using a device, such as a burner, which prevents the adhesion of the slag.

Additionally, Patent Document 2 discloses a method of imaging a molten slag discharged from a slag outlet using a camera and removing the slag using a temperature-raising device or the like on the basis of the shape of the slag.

CITATION LIST

Patent Literature

[Patent Document 1] Japanese Unexamined Patent Application, First Publication No. 2013-217641

[Patent Document 2] Japanese Unexamined Patent Application, First Publication No. 2002-295824

DISCLOSURE OF INVENTION

Technical Problem

Meanwhile, the amount of adhesion of the adhering substances, such as the slag, may increase or decrease depending on the operation conditions of the gasification melting systems. FIG. 17 is a graph illustrating changes over time of the opening area (the area of the slag outlet in a case where the slag has adhered) of the slag outlet with a horizontal axis representing time and a vertical axis representing the opening area.

Here, a blocking prevention device, which determines a threshold "α" for determining that the slag outlet is blocked and operates a device that prevents the blocking in a case where the slag outlet is determined to be blocked, will be described. As illustrated by a solid line of FIG. 17, in a case where the blocking proceeds gently, the blocking can be prevented as a blocking release operation is started when the opening area reaches "α". On the other hand, as illustrated by a dotted line of FIG. 17, in a case where the blocking proceeds rapidly, even if the blocking release operation is started when the opening area reaches "α", there is a concern that blocking release work may not be in time and an opening part may be blocked. Additionally, there is a concern that an operator may be late in noticing the progress of the blocking, the blocking release work may not be in time, and the opening part may be blocked.

An object of the invention provides a blocking prevention device for a gasification melting system and a blocking prevention method for a gasification melting system that can predict the blocking of openings, such as a slag outlet, early and can prevent the openings from being blocked even in a case where blocking of openings proceeds suddenly.

Solution to Problem

According to a first aspect of the invention, a blocking prevention device for a gasification melting system that combusts and melts an object to be treated into a slag in a melting furnace after the object to be treated is converted into pyrolysis gas in a gasification furnace includes a slag adhesion prevention device that has a slag adhesion prevention capability for preventing adhesion of the slag at an opening part that may be blocked due to the adhesion of the slag; an imaging device that images the opening part; and a control device including a calculation unit that calculates a change rate of an opening area of the opening part using a plurality of images with different capturing times or a video, captured by the imaging device, and a prevention device control unit that changes the slag adhesion prevention capabilities of a plurality of the slag adhesion prevention devices in accordance with the change rate.

According to such a configuration, the slag adhesion prevention capabilities of the slag adhesion prevention devices are changed on the basis of the change rate of the opening area of the opening part. Accordingly, even in a case where the blocking of the opening part proceeds suddenly, the blocking can be predicted early, the slag adhesion prevention work can be started, and the opening part can be prevented from being blocked. Additionally, by controlling the slag adhesion prevention device with the control device, the prevention of the blocking can be reliably performed regardless of differences in human experience.

In the above blocking prevention device for a gasification melting system, the prevention device control unit may change the slag adhesion prevention capabilities of the plurality of slag adhesion prevention devices on the basis of the opening area and the change rate.

According to such a configuration, by performing control with reference to the opening area in addition to the change rate of the opening area, it is possible to cope with even a case where the change rate is slow but the opening area is small.

In the above blocking prevention device for a gasification melting system, the prevention device control unit may operate all the slag adhesion prevention devices with a first slag adhesion prevention capability higher than a predetermined slag adhesion prevention capability in a case where the change rate is larger than a first change rate and the opening area is smaller than a first opening area, and may operate all the slag adhesion prevention devices with a second slag adhesion prevention capability lower than the predetermined slag adhesion prevention capability in a case where the change rate is larger than the first change rate and the opening area is larger than a second opening area which is larger than the first opening area.

In the above blocking prevention device for a gasification melting system, the prevention device control unit may operate at least some of the slag adhesion prevention devices with a slag adhesion prevention capability that is lower than the first slag adhesion prevention capability and higher than the second slag adhesion prevention capability in a case where the change rate is larger than the first change rate, and the opening area is larger than the first opening area and smaller than the second opening area.

In the above blocking prevention device for a gasification melting system, the prevention device control unit may not operate at least some of the slag adhesion prevention devices in a case where the change rate is smaller than a second change rate which is smaller than the first change rate and the opening area is larger than the second opening area, and may operate at least some of the slag adhesion prevention devices with a slag adhesion prevention capability lower than the second slag adhesion prevention capability in a case where the change rate is smaller than the second change rate and the opening area is smaller than the first opening area.

In the above blocking prevention device for a gasification melting system, the opening part may be a throat part of the melting furnace of the gasification melting system, the imaging device may be disposed at a top of the melting furnace so as to image the throat part from above, the plurality of slag adhesion prevention devices may include a secondary combustion chamber air supply device that introduces combustion air into a secondary combustion chamber provided above the throat part of the melting furnace, and a basicity modifier supply device that introduces a basicity modifier into the melting furnace, the slag adhesion prevention capability of the secondary combustion chamber air supply device may be high in a case where an amount of introduction of the combustion air is large, and is low in a case where the amount of introduction of the combustion air is small, and the slag adhesion prevention capability of the basicity modifier supply device may be high in a case where an amount of introduction of the basicity modifier is large, and is low in a case where the amount of introduction of the basicity modifier is small, and a pyrolysis gas duct may be provided below the throat part such that the pyrolysis gas becomes an upward flow with respect to the throat part.

According to such a configuration, by increasing the amount of supply of the combustion air to be supplied to the secondary combustion chamber and raising the temperature of the secondary combustion chamber, the slag adhering to the throat part can be melted and made to flow. Additionally, by supplying the basicity modifier, the basicity of the slag becomes high. Accordingly, the melting point of the slag rises, the viscosity becomes low, and the slag can be made to flow.

Additionally, dust contained in the pyrolysis gas introduced into the secondary combustion chamber can be reduced, and an image captured from the top of the furnace can be made clearer.

Additionally, since the temperature at the installation location of the imaging device where the throat part is imaged from above is lower than the temperature below the throat part, the imaging device can be installed at a lower cost.

In the above blocking prevention device for a gasification melting system, the opening part may be a slag outlet part of the melting furnace of the gasification melting system, the imaging device may be installed at a bottom of the melting furnace so as to image the slag outlet part from below, the plurality of slag adhesion prevention devices may include a basicity modifier supply device that introduces a basicity modifier into the melting furnace, and a burner device that heats the slag outlet part, the slag adhesion prevention capability of the basicity modifier supply device may be high in a case where an amount of introduction of the basicity modifier is large, and may be low in a case where the amount of introduction of the basicity modifier is small, and the slag adhesion prevention capability of the burner device may be high in a case where a burner output of the burner device is large and is low in a case where the burner output of the burner device is small.

According to such a configuration, by increasing the burner output of the burner device, the slag adhering to the slag outlet part can be melted and can be made to flow. Additionally, by supplying the basicity modifier, the basicity of the slag becomes high. Accordingly, the melting point of the slag rises, the viscosity becomes low, and the slag can be made to flow.

In the above blocking prevention device for a gasification melting system, the calculation unit may calculate a weir height of the slag outlet part on the basis of the image, and the prevention device control unit may change the slag adhesion prevention capabilities of the plurality of slag adhesion prevention devices on the basis of the weir height.

According to such a configuration, in a case where there is no abnormality in the change rate of the opening area and the opening area but the weir height is abnormal, the adhesion of the slag can be prevented.

In the above blocking prevention device for a gasification melting system, a display device may be further provided, and the control device may include a display control unit that makes the display device display a text or a color corresponding to the opening area or the change rate.

According to such a configuration, an operator can easily recognize the blocking situation of the opening part.

According to a second aspect of the invention, a blocking prevention method for a gasification melting system that combusts and melts an object to be treated into a slag in a melting furnace after the object to be treated is converted into pyrolysis gas in a gasification furnace includes an imaging step of imaging an opening part that may be blocked due to adhesion of the slag; a calculation step of calculating a change rate of an opening area of the opening part, using a plurality of images with different capturing times or a video, captured in the imaging step; and a slag adhesion prevention step of changing, using a plurality of slag adhesion prevention devices having slag adhesion prevention capabilities for preventing the adhesion of the slag, the slag adhesion prevention capabilities of the respective slag adhesion prevention devices in accordance with the change rate.

In the above blocking prevention method for a gasification melting system, in the slag adhesion prevention step, the slag adhesion prevention capabilities of the plurality of slag adhesion prevention devices may be changed on the basis of the opening area and the change rate.

In the above blocking prevention method for a gasification melting system, in the slag adhesion prevention step, all the slag adhesion prevention devices may be operated with a first slag adhesion prevention capability higher than a predetermined slag adhesion prevention capability, in a case where the change rate is larger than a first change rate and the opening area is smaller than a first opening area, and all the slag adhesion prevention devices may be operated with a second slag adhesion prevention capability lower than the predetermined slag adhesion prevention capability, in a case where the change rate is larger than the first change rate and the opening area is larger than a second opening area which is larger than the first opening area.

In the above blocking prevention method for a gasification melting system, in the slag adhesion prevention step, at least one of the slag adhesion prevention devices may be operated with a slag adhesion prevention capability that is lower than the first slag adhesion prevention capability and higher than the second slag adhesion prevention capability, in a case where the change rate is larger than the first change rate and in a case where the opening area is larger than the first opening area and smaller than the second opening area.

In the above blocking prevention method for a gasification melting system, in the slag adhesion prevention step, at least one of the slag adhesion prevention devices may not be operated, in a case where the change rate is smaller than a second change rate which is smaller than the first change rate and the opening area is larger than the second opening area, and at least one of the slag adhesion prevention devices may be operated with a slag adhesion prevention capability lower than the second slag adhesion prevention capability, in a case where the change rate is smaller than the second change rate and the opening area is smaller than the first opening area.

In the above blocking prevention method for a gasification melting system, the opening part may be a throat part of the melting furnace of the gasification melting system, the throat part may be imaged from above, the plurality of slag adhesion prevention devices may be a secondary combustion chamber air supply device that introduces combustion air into a secondary combustion chamber provided above the throat part of the melting furnace, and a basicity modifier supply device that introduces a basicity modifier into the melting furnace, the slag adhesion prevention capability of the secondary combustion chamber air supply device is high in a case where an amount of introduction of the combustion air is large, and is low in a case where the amount of introduction of the combustion air is small, and the slag adhesion prevention capability of the basicity modifier supply device may be high in a case where an amount of introduction of the basicity modifier is large, and may be low in a case where the amount of introduction of the basicity modifier is small.

In the above blocking prevention method for a gasification melting system, the opening part may be a slag outlet part of the melting furnace, in the imaging step, the slag outlet part may be installed to be imaged from below, the plurality of slag adhesion prevention devices may be a basicity modifier supply device that introduces a basicity modifier into the melting furnace, and a burner device that heats the slag outlet part, the slag adhesion prevention capability of the basicity modifier supply device may be high in a case where an amount of introduction of the basicity modifier is large, and is low in a case where the amount of introduction of the basicity modifier is small, and the slag adhesion prevention capability of the burner device may be high in a case where a burner output of the burner device is large and is low in a case where the burner output of the burner device is small.

In the above blocking prevention method for a gasification melting system, in the calculation step, a weir height of the slag outlet part may be calculated on the basis of the image, and in the slag adhesion prevention step, the slag adhesion prevention capabilities of the plurality of slag adhesion prevention devices may be changed on the basis of the weir height.

In the above blocking prevention method for a gasification melting system, in the slag adhesion prevention step, the display device may be made to display a text or a color corresponding to the opening area or the change rate.

Advantageous Effects of Invention

According to the invention, the slag adhesion prevention capabilities of the slag adhesion prevention devices are changed on the basis of the change rate of the opening area of the opening part. Accordingly, even in a case where the blocking of the opening part proceeds suddenly, the blocking can be predicted early, the slag adhesion prevention work can be started, and the opening part can be prevented from being blocked.

Additionally, by controlling the slag adhesion prevention device with the control device, the prevention of the blocking can be reliably performed regardless of differences in human experience.

BEST MODE FOR CARRYING OUT THE INVENTION

Hereinafter, an embodiment related to the invention will be described with reference to the drawings.

Figure 1:
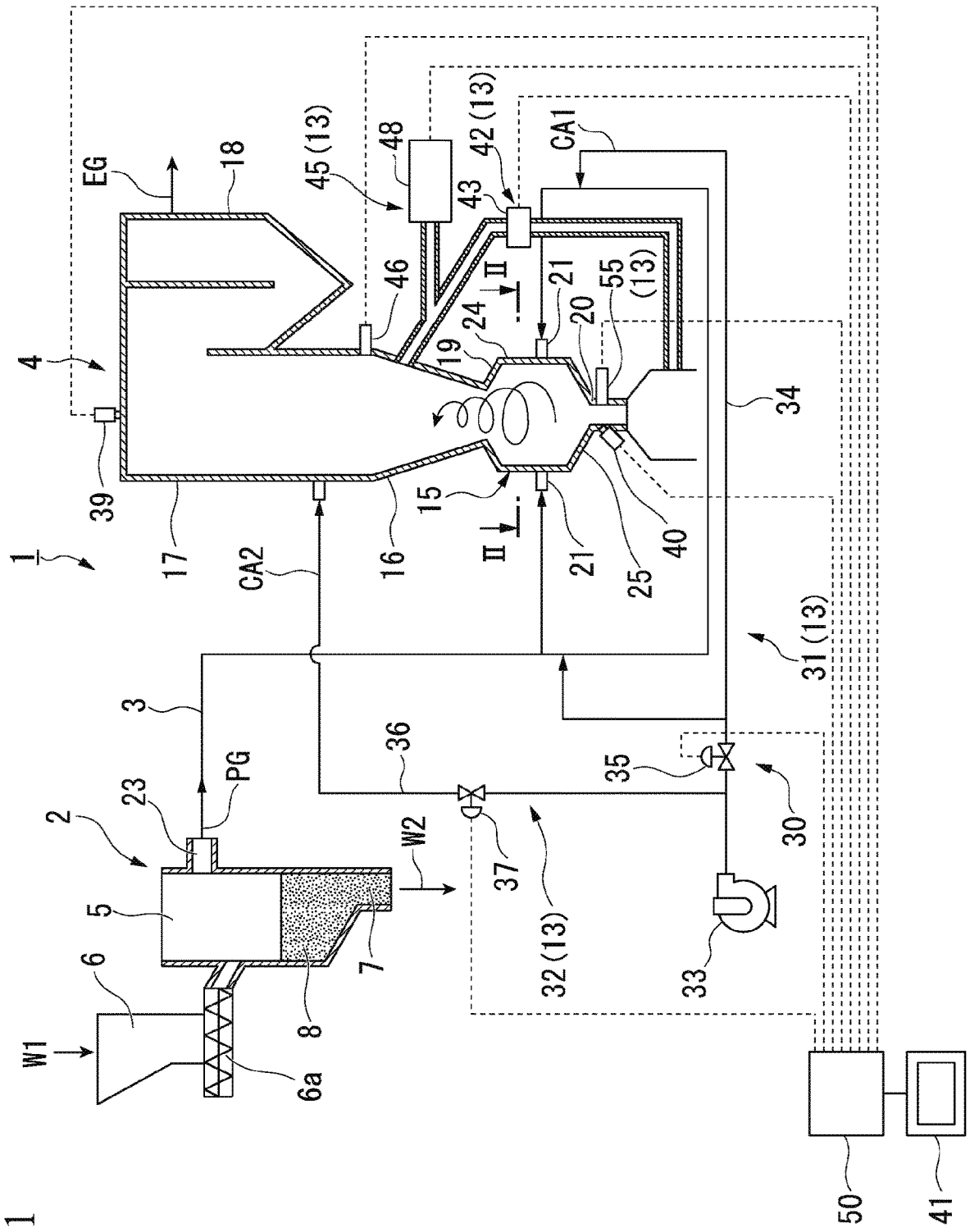
FIG. 1 is a schematic configuration view of a gasification melting system of an embodiment of the invention.

As illustrated in FIG. 1, a gasification melting system 1 of the present embodiment is a system that combusts and melts an object to be treated, such as waste W1, into a slag in a melting furnace 4 after being pyrolyzed and gasified in a gasification furnace 2. The gasification melting system 1 includes the gasification furnace 2 (fluidized bed gasification furnace), the melting furnace 4, a combustion air supply device 30 that supplies combustion air to the melting furnace 4, and a slag adhesion prevention device 13 (refer to FIG. 3 and FIG. 10) that prevents blocking of opening parts (a throat part 16, a slag outlet part 20) within the melting furnace 4. Pyrolysis gas PG generated by performing the pyrolysis of the waste W1 in the gasification furnace 2 is introduced into the melting furnace 4 via a pyrolysis gas passage 3.

Here, the opening parts are parts to which slag may adhere and are parts that may be blocked by the adhesion of the slag. The opening parts of the present embodiment are the throat part 16 and the slag outlet part 20.

The gasification furnace 2 includes a gasification furnace body 5, and a side wall of this gasification furnace body 5 is provided with a waste input port 6 including a waste discharge device 6a. A top of the gasification furnace body 5 is provided with a pyrolysis gas discharge port 23 for exhausting the pyrolysis gas PG generated within the furnace. A lower part of the gasification furnace body 5 is provided with an incombustibles discharge port 7. A fluid medium 8 is circulated and supplied at a bottom part of the gasification furnace 2.

The melting furnace 4 includes a vertical swirling melting furnace 15, a secondary combustion chamber 17 coupled to an upper side of the vertical swirling melting furnace 15 via the throat part 16, and a boiler unit 18 coupled to a downstream side of the secondary combustion chamber 17.

The vertical swirling melting furnace 15 is a circular cross-sectional shape, and an upper part thereof is provided with an exhaust gas outlet 19 having a throttle structure. The vertical swirling melting furnace 15 includes a melting furnace body part 24 having a substantially cylindrical shape, the exhaust gas outlet 19 that is connected to an upper part of the melting furnace body part 24 and is gradually reduced in diameter upward, an inclined surface part 25 that is connected to a lower part of the melting furnace body part 24 and is gradually reduced in diameter downward, and a slag outlet part 20 that is connected to a lower part of the inclined surface part 25.

Figure 2:
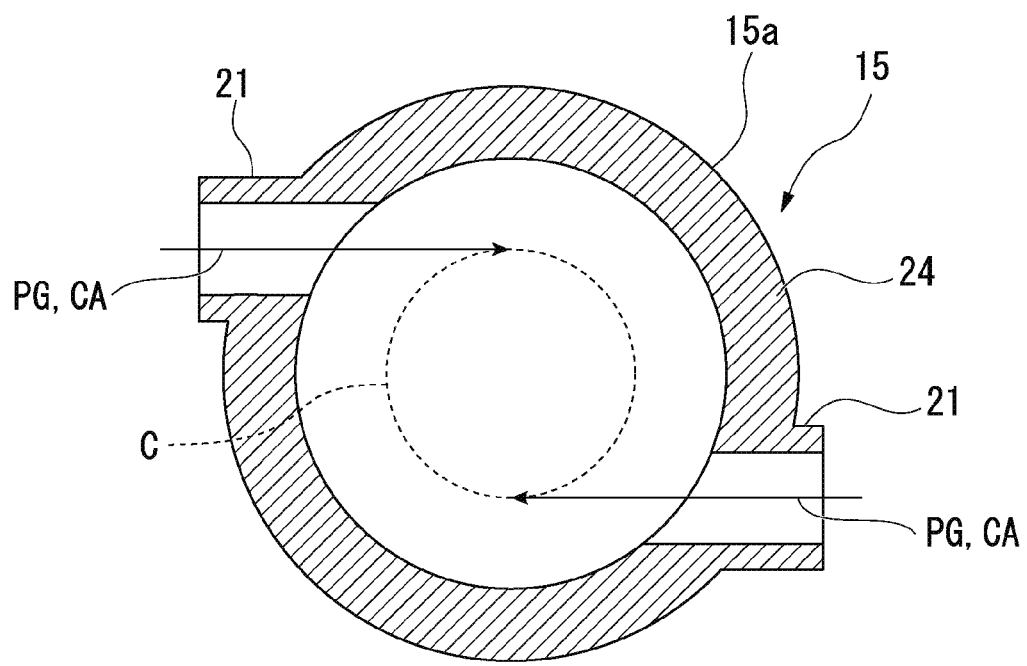
FIG. 2 is a sectional view taken along II-II of FIG. 1 and is a view illustrating the shape of a vertical swirling melting furnace including a pyrolysis gas duct.

As illustrated in FIG. 2, the vertical swirling melting furnace 15 includes a substantially cylindrical furnace wall 15a, and a pair of pyrolysis gas ducts 21 for introducing the pyrolysis gas PG. The pyrolysis gas ducts 21 are disposed such that the pyrolysis gas PG introduced from the pyrolysis gas ducts 21 is jetted in a tangential direction of a circle C that swirls inside the furnace.

The secondary combustion chamber 17 has an inner surface formed in a substantially cylindrical cross-sectional shape. The throat part 16, which is reduced in diameter toward the exhaust gas outlet 19 of the vertical swirling melting furnace 15, is provided on a lower end side of the secondary combustion chamber 17.

The boiler unit 18 is provided on an exhaust gas downstream side of the secondary combustion chamber 17, and the heat recovery is performed by a superheater (not illustrated) or the like installed in a flue. The exhaust gas EG, which has passed through the boiler unit 18, is released from a chimney through a reaction dust collector, a catalytic reaction device, and the like in the subsequent stage to the atmosphere.

As illustrated in FIG. 1, the combustion air supply device 30 has a melting furnace air supply device 31 that supplies combustion air CA1 to the vertical swirling melting furnace 15, and a secondary combustion chamber air supply device 32 that supplies combustion air CA2 to the secondary combustion chamber 17.

The melting furnace air supply device 31 includes a blower 33, and a melting furnace air supply pipe 34 that connects the blower 33 and the pyrolysis gas passage 3 to each other. The melting furnace air supply pipe 34 is provided with a melting furnace air volume-adjusting valve 35 that adjusts the flow rate of the combustion air CA1 that flows through the melting furnace air supply pipe 34. The combustion air CA1, which has been introduced into the pyrolysis gas passage 3 via the melting furnace air supply pipe 34, is supplied to the vertical swirling melting furnace 15 via the pyrolysis gas ducts 21.

The secondary combustion chamber air supply device 32 includes the blower 33, and a secondary combustion chamber air supply pipe 36 that connects the blower 33 and the secondary combustion chamber 17 to each other. The secondary combustion chamber air supply pipe 36 is provided with a secondary combustion chamber air volume-adjusting valve 37 that adjusts the flow rate of the combustion air CA2 that flows through the secondary combustion chamber air supply pipe 36.

The blower 33 of the melting furnace air supply device 31 and the blower 33 of the secondary combustion chamber air supply device 32 may be separately disposed, or may be in common.

The pyrolysis gas passage 3 is branched into two at a predetermined position from an upstream side (gasification furnace 2 side) toward the downstream side (vertical swirling melting furnace 15 side). The pyrolysis gas passage 3 branched into two is connected to the pair of pyrolysis gas ducts 21, respectively.

The melting furnace air supply pipe 34 branched into two is connected to the pyrolysis gas passage 3 branched into two. Accordingly, the combustion air CA1 is introduced into the vertical swirling melting furnace 15 together with the pyrolysis gas PG.

In addition, the pyrolysis gas passage 3 and the melting furnace air supply pipe 34 are not necessarily branched on the downstream side. The pyrolysis gas PG and the combustion air may be introduced into the vertical swirling melting furnace 15 from a single pyrolysis gas duct 21, without branching the pyrolysis gas passage 3 and the melting furnace air supply pipe 34.

Additionally, in order to introduce the pyrolysis gas PG into a plurality of the vertical swirling melting furnaces 15 from the single gasification furnace 2, the gasification furnace 2 may be provided with a plurality of pyrolysis gas passages 3.

Next, the operation of the gasification melting system 1 of the present embodiment will be described.

The waste W1 input from the waste input port 6 is quantitatively supplied to the gasification furnace 2 via a waste discharge device 6a, and then is pyrolyzed and gasified and is decomposed into gas, tar, and char (carbide). Although the tar is a component that becomes liquid at normal temperature, the tar is present in a gaseous state within the gasification furnace 2. The char is gradually pulverized within a fluidized layer, and is introduced into the melting furnace 4 as the pyrolysis gas PG along with the gas and the tar.

After the pyrolysis gas PG supplied from the gasification furnace 2 is mixed with the combustion air CA1, the pyrolysis gas PG is supplied into the vertical swirling melting furnace 15, and an ash component contained in the pyrolysis gas PG is melted by high-temperature combustion at 1400° C. to 1500° C. to generate a slag.

An exhaust gas at a high temperature of 800° C. to 1000° C., which has been discharged via the exhaust gas outlet 19 from the vertical swirling melting furnace 15, is introduced into the secondary combustion chamber 17. In the secondary combustion chamber 17, perfect combustion of unburned combustibles contained in the exhaust gas is performed.

In cases where the slag adheres, there is a case where the slag adheres to the exhaust gas outlet 19 and the throat part 16 along with the pyrolysis gas PG (exhaust gas) that is an upward flow, and a case where the slag adheres to the slag outlet part 20 while flowing down along an inner wall of the vertical swirling melting furnace 15.

[Blocking Prevention Device]

Next, a blocking prevention device (refer to FIG. 3 and FIG. 10) of the gasification melting system 1 will be described. The blocking prevention device includes a first blocking prevention device 11 that prevents the blocking of the throat part 16 of the melting furnace 4, and a second blocking prevention device 12 that prevents the blocking of the slag outlet part 20.

That is, the first blocking prevention device 11 is a device that prevents the adhesion of the slag in the throat part 16 of the melting furnace 4, and the second blocking prevention device 12 is a device that prevents the adhesion of the slag in the slag outlet part 20 of the melting furnace 4.

Although the first blocking prevention device 11 and the second blocking prevention device 12 can be simultaneously operated, only either one of the first blocking prevention device 11 and the second blocking prevention device 12 may be operated.

The first blocking prevention device 11 and the second blocking prevention device 12 have common components except for imaging devices 39 and 40 and a burner device 55.

[First Blocking Prevention Device]

Hereinafter, the first blocking prevention device 11, which prevents the blocking of the throat part 16 of the melting furnace 4, will be described.

Figure 3:
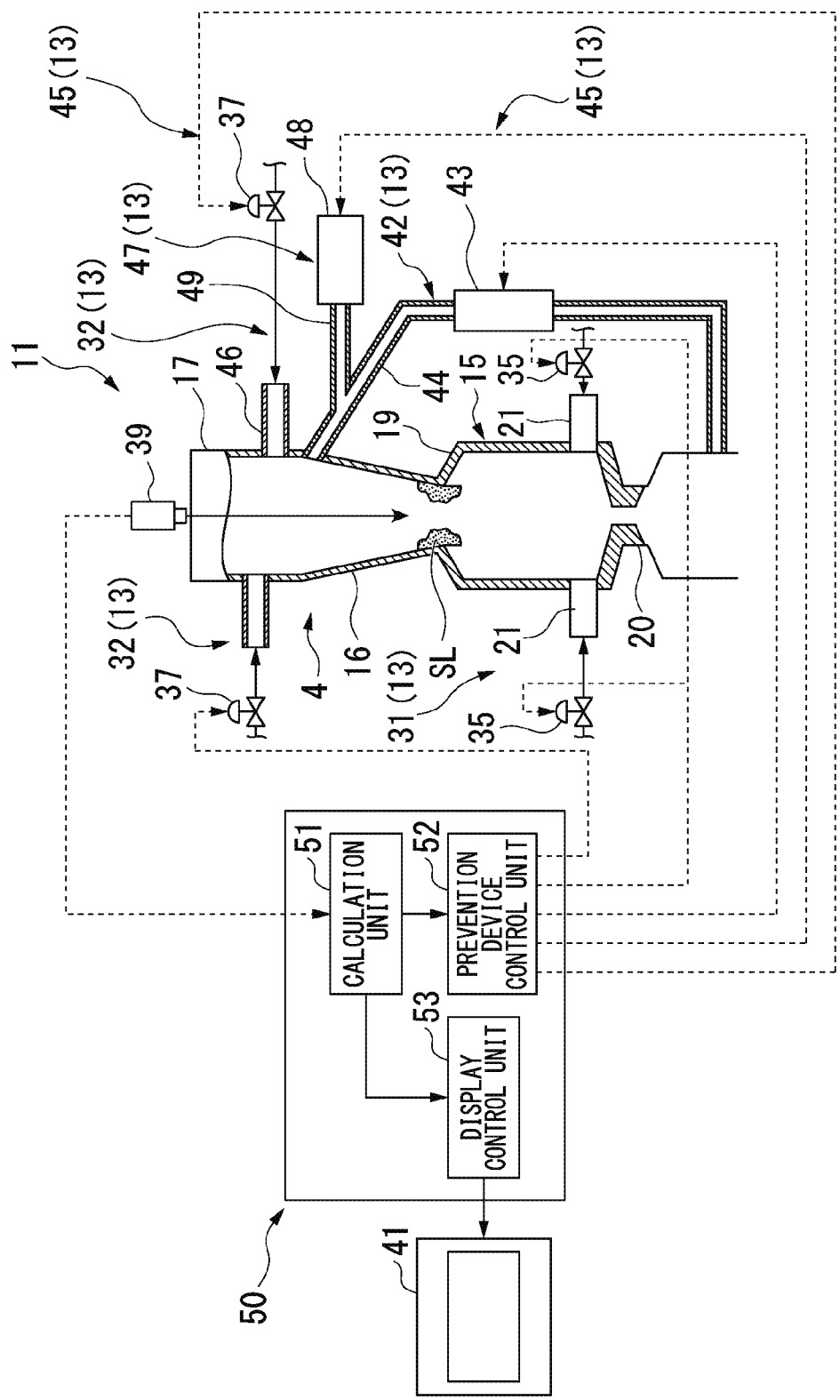
FIG. 3 is a schematic configuration view of a first blocking prevention device of the melting furnace and the gasification melting system of the embodiment of the invention.

As illustrated in FIG. 3, the first blocking prevention device 11 includes a first imaging device 39 provided at the top of the melting furnace 4, a display device 41 that displays a warning or the like in accordance with the state of the throat part 16, and a control device 50.

Additionally, the first blocking prevention device 11 includes a plurality of the slag adhesion prevention devices 13 that prevent the adhesion of the slag in the throat part 16 or remove the slag.

The melting furnace air supply device 31, the secondary combustion chamber air supply device 32, a basicity modifier supply device 42 to be described below, and an oxygen supply device 45 are devices that function as the slag adhesion prevention devices 13 in the first blocking prevention device 11.

The control device 50 includes a calculation unit 51 that calculates the opening area of the throat part 16 and the change rate of the opening area, using a video or a plurality of images with different capturing times, which are captured by the first imaging device 39, a prevention device control unit 52 that controls the plurality of slag adhesion prevention devices 13 in accordance with the opening area and the change rate of the opening area, and a display control unit 53 that controls the display device 41.

Figure 4:
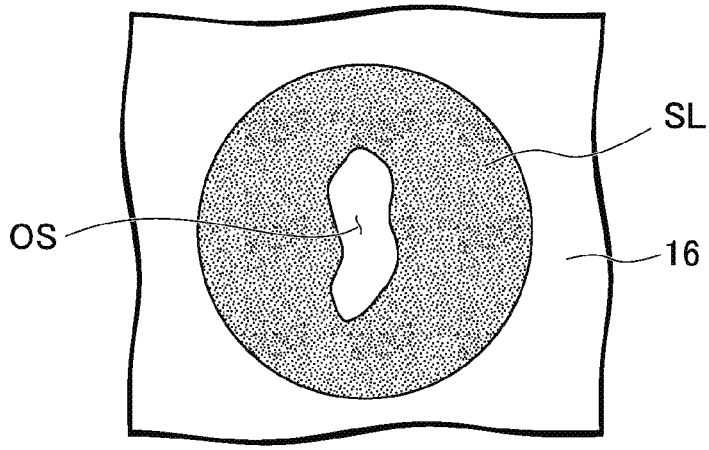
FIG. 4 is a view of a throat part as seen from above, and is a schematic view illustrating the opening area of the throat part.

Here, the opening area of the throat part 16 will be described. As illustrated in FIG. 4, an opening area OS of the throat part 16 is the area of a hole formed by the slag SL adhering to the throat part 16. As more slags SL adhere to the throat part 16, the opening area OS becomes smaller. The opening area OS becomes an indicator of a blocking situation of the throat part 16.

As illustrated in FIG. 3, the basicity modifier supply device 42 is a device that supplies a basicity modifier to the secondary combustion chamber 17. The basicity modifier supply device 42 includes an ejector 43 and a basicity modifier supply pipe 44. The basicity modifier is introduced into the ejector 43 from a supply pipe that is not illustrated, and is carried up to the throat part by the ejector 43.

As the basicity modifier, substances containing a large amount of Si, such as sand and gravel containing $SiO_2$, substances containing a large amount of Ca, such as slaked lime $(Ca(OH)_2)$, ash mainly composed of Si or Ca not containing a large amount of heavy metals, soil, or the like are used.

The oxygen supply device 45 is a device that supplies oxygen to the basicity modifier supply pipe 44 and the secondary combustion chamber 17. The oxygen supply device 45 includes a first oxygen supply device 46 that supplies oxygen to the secondary combustion chamber 17, and a second oxygen supply device 47 that supplies oxygen to the basicity modifier supply pipe 44.

The second oxygen supply device 47 includes an oxygen supply device body 48, and an oxygen supply pipe 49 that connects the oxygen supply device body 48 and the basicity modifier supply pipe 44 to each other.

Each slag adhesion prevention device 13 has a slag adhesion prevention capability that is the capability to prevent the adhesion of the slag or to remove the slag. The slag adhesion prevention capability of each slag adhesion prevention device 13 can be made high or can be made low. The slag adhesion prevention capability is set to prevent adhesion of more slag and to remove more slag as the slag adhesion prevention capability becomes higher.

The prevention device control unit 52 of the control device 50 changes the slag adhesion prevention capability of the slag adhesion prevention device 13.

The slag adhesion prevention capability of the melting furnace air supply device 31 in the first blocking prevention device 11 is high in a case where the amount of introduction of the combustion air CA1 into the vertical swirling melting furnace 15 is small, and is low in a case where the amount of introduction of the combustion air CA1 into the vertical swirling melting furnace 15 is large. That is, as the amount of supply of the combustion air CA1 into the vertical swirling melting furnace 15 is reduced, the adhesion of the slag is further suppressed.

The prevention device control unit 52 of the control device 50 of the present embodiment can change the slag adhesion prevention capability of the melting furnace air supply device 31 in four stages, using the melting furnace air volume-adjusting valve 35.

In the slag adhesion prevention capability of the melting furnace air supply device 31, a "highest" slag adhesion prevention capability (a first slag adhesion prevention capability, the highest slag adhesion prevention capability) is a slag adhesion prevention capability higher than a predetermined slag adhesion prevention capability. In a case where the melting furnace air supply device 31 is operated with the "highest" slag adhesion prevention capability, the combustion air supplied from the melting furnace air supply device 31 decreases most.

A "middle" slag adhesion prevention capability (a second slag adhesion prevention capability) is lower than the predetermined slag adhesion prevention capability.

A "high" slag adhesion prevention capability is lower than the "highest" slag adhesion prevention capability (first slag adhesion prevention capability), and is higher than the "middle" slag adhesion prevention capability (second slag adhesion prevention capability).

A "low" slag adhesion prevention capability (a lowest slag adhesion prevention capability) is lower than the "middle" slag adhesion prevention capability.

The slag adhesion prevention capability of the secondary combustion chamber air supply device 32 in the first blocking prevention device 11 is high in a case where the amount of introduction of the combustion air CA2 into the secondary combustion chamber 17 is large, and is low in a case where the amount of introduction of the combustion air CA2 into the secondary combustion chamber 17 is small. That is, as the amount of supply of the combustion air CA2 to the secondary combustion chamber 17 is increased, the adhesion of the slag is further suppressed.

The prevention device control unit 52 of the control device 50 of the present embodiment can change the slag adhesion prevention capability of the secondary combustion chamber air supply device 32 in four stages, using the secondary combustion chamber air volume-adjusting valve 37, similarly to the melting furnace air supply device 31.

In a case where the secondary combustion chamber air supply device 32 is operated with the "highest" slag adhesion prevention capability, the combustion air supplied from the secondary combustion chamber air supply device 32 increases most.

By increasing the amount of introduction of the combustion air CA2 into the secondary combustion chamber 17 and decreasing the amount of introduction of the combustion air CA1 to the vertical swirling melting furnace 15, the temperature within the secondary combustion chamber 17 rises. Accordingly, the slag of the throat part 16 is further melted, and the adhesion of the slag to the throat part 16 is suppressed.

The slag adhesion prevention capability of the basicity modifier supply device 42 in the first blocking prevention device 11 is high in a case where the amount of introduction of the basicity modifier is large and is low in a case where the amount of introduction of the basicity modifier is small.

The prevention device control unit 52 of the control device 50 of the present embodiment can change the slag adhesion prevention capability of the basicity modifier supply device 42 in three stages.

In the slag adhesion prevention capability of the basicity modifier supply device 42, a "high" slag adhesion prevention capability (a first slag adhesion prevention capability, the highest slag adhesion prevention capability) is higher than a predetermined slag adhesion prevention capability. A "middle" slag adhesion prevention capability (a second slag adhesion prevention capability) is lower than the predetermined slag adhesion prevention capability. A "low" slag adhesion prevention capability (the lowest slag adhesion prevention capability) is lower than the "middle" slag adhesion prevention capability.

By supplying the basicity modifier, the basicity ($CaO/SiO_2$) of the slag becomes high. As a result, the melting point of the slag rises, the viscosity becomes low, and the slag further flows down.

In addition, in a case where the first blocking prevention device 11 and the second blocking prevention device 12 are simultaneously operated, the control device 50 can be operated in four stages of the "highest", "high", "middle", and "low" in conformity with the second blocking prevention device 12. However, the basicity modifier supply device 42 of the first blocking prevention device 11 may be operated in three stages of "high", "middle", and "low" among these.

The slag adhesion prevention capability of the oxygen supply device 45 in the first blocking prevention device 11 is high in a case where the amount of introduction of oxygen is large, and is low in a case where the amount of introduction of oxygen is small.

The prevention device control unit 52 of the control device 50 of the present embodiment can change the slag adhesion prevention capability of the oxygen supply device 45 in three stages similarly to the basicity modifier supply device 42.

By supplying oxygen, the temperature within the secondary combustion chamber 17 rises. Accordingly, the slag of the throat part 16 is further melted.

[Blocking Prevention Method Using First Blocking Prevention Device]

Next, a blocking prevention method for the gasification melting system 1 using the first blocking prevention device 11 will be described.

Figure 5:
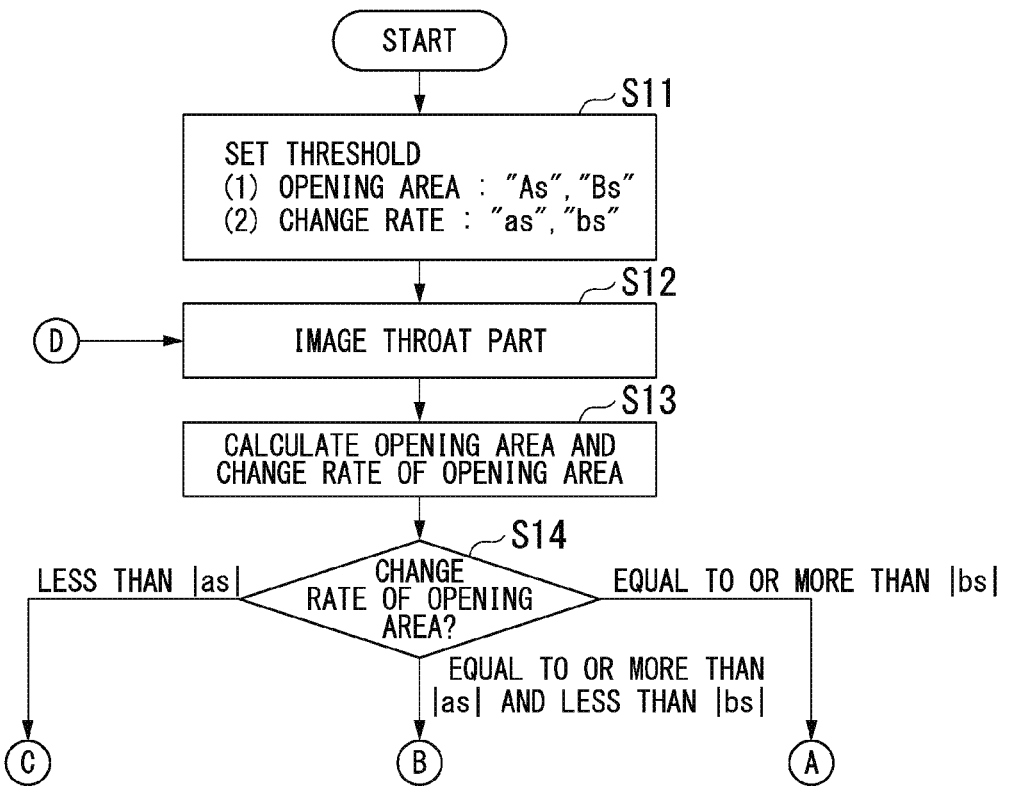
FIG. 5 is a flowchart illustrating a blocking prevention method for a gasification melting system using the first blocking prevention device of the embodiment of the invention.

As illustrated in FIG. 5, the blocking prevention method for the gasification melting system 1 using the first blocking prevention device 11 has a threshold-setting step S11 of setting a threshold referred to in a later determination step, an imaging step S12 of imaging the throat part 16 that is an opening part, a calculation step S13 of calculating the opening area of the throat part 16 and the change rate of the opening area on the basis of information captured in the imaging step S12, and a change rate determination step S14 of determining on the basis of the change rate of the opening area of the throat part 16.

Figure 6:
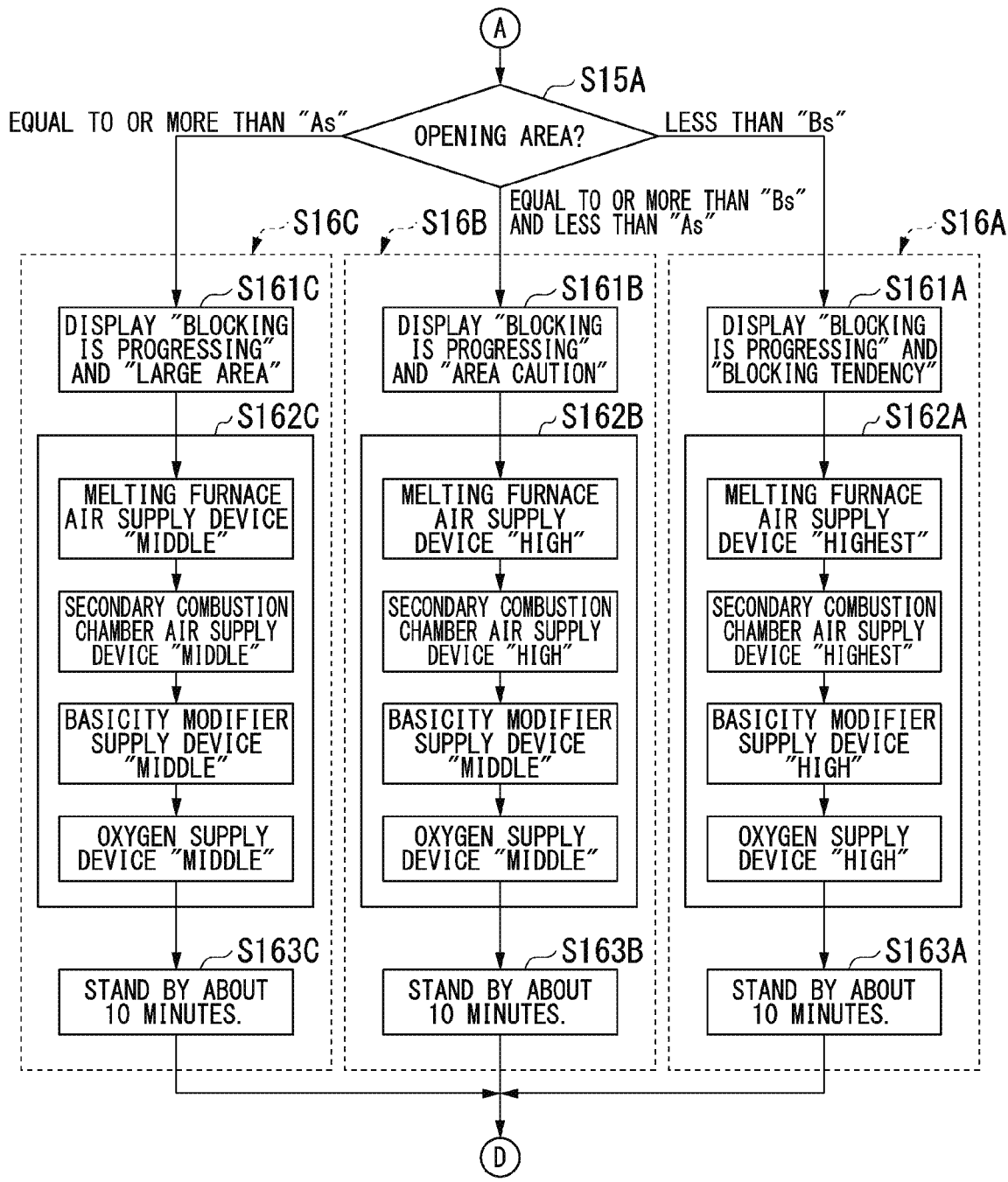
FIG. 6 is a flowchart illustrating a blocking prevention method for a gasification melting system using the first blocking prevention device of the embodiment of the invention.
Figure 7:
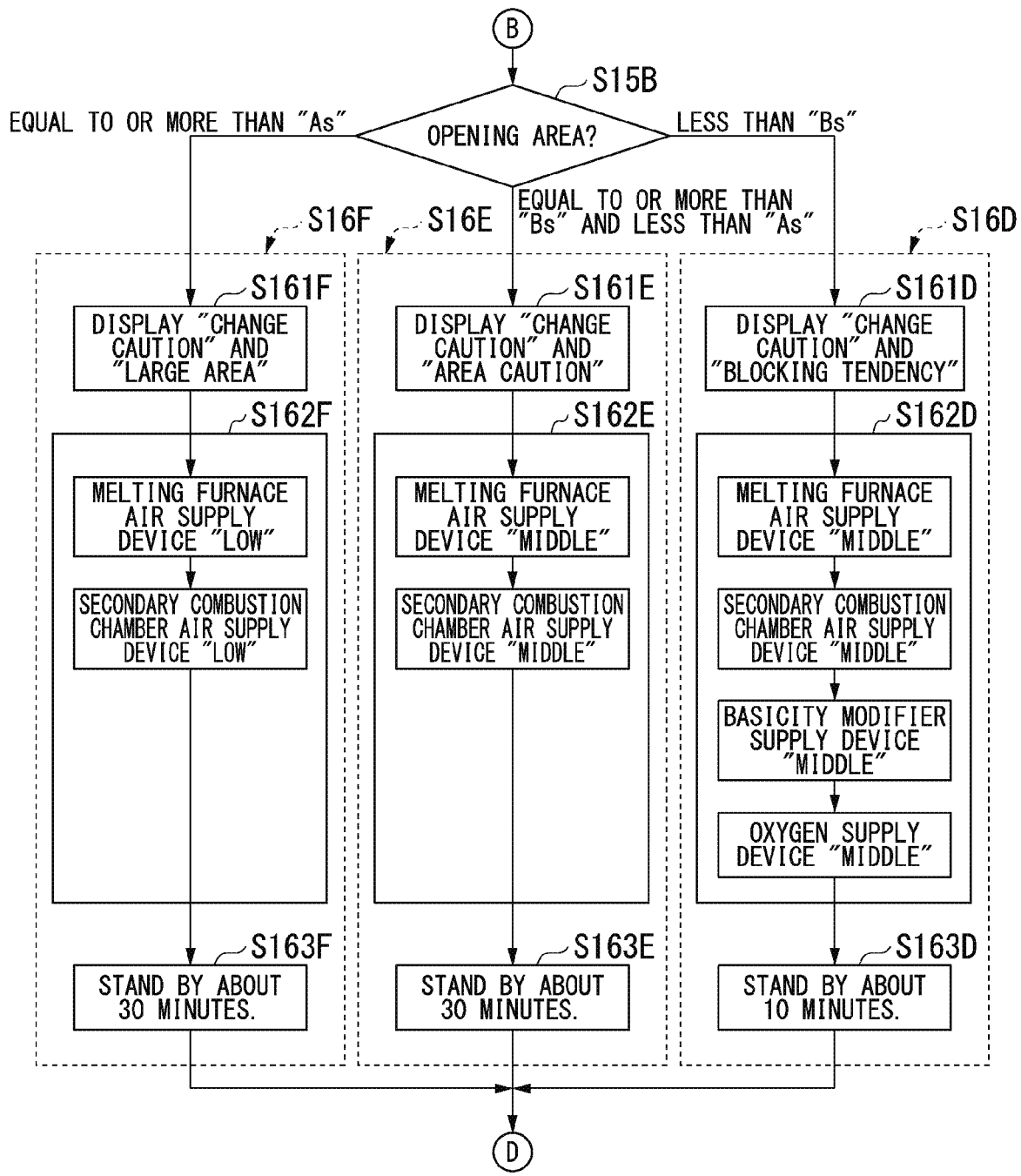
FIG. 7 is a flowchart illustrating a blocking prevention method for a gasification melting system using the first blocking prevention device of the embodiment of the invention.
Figure 8:
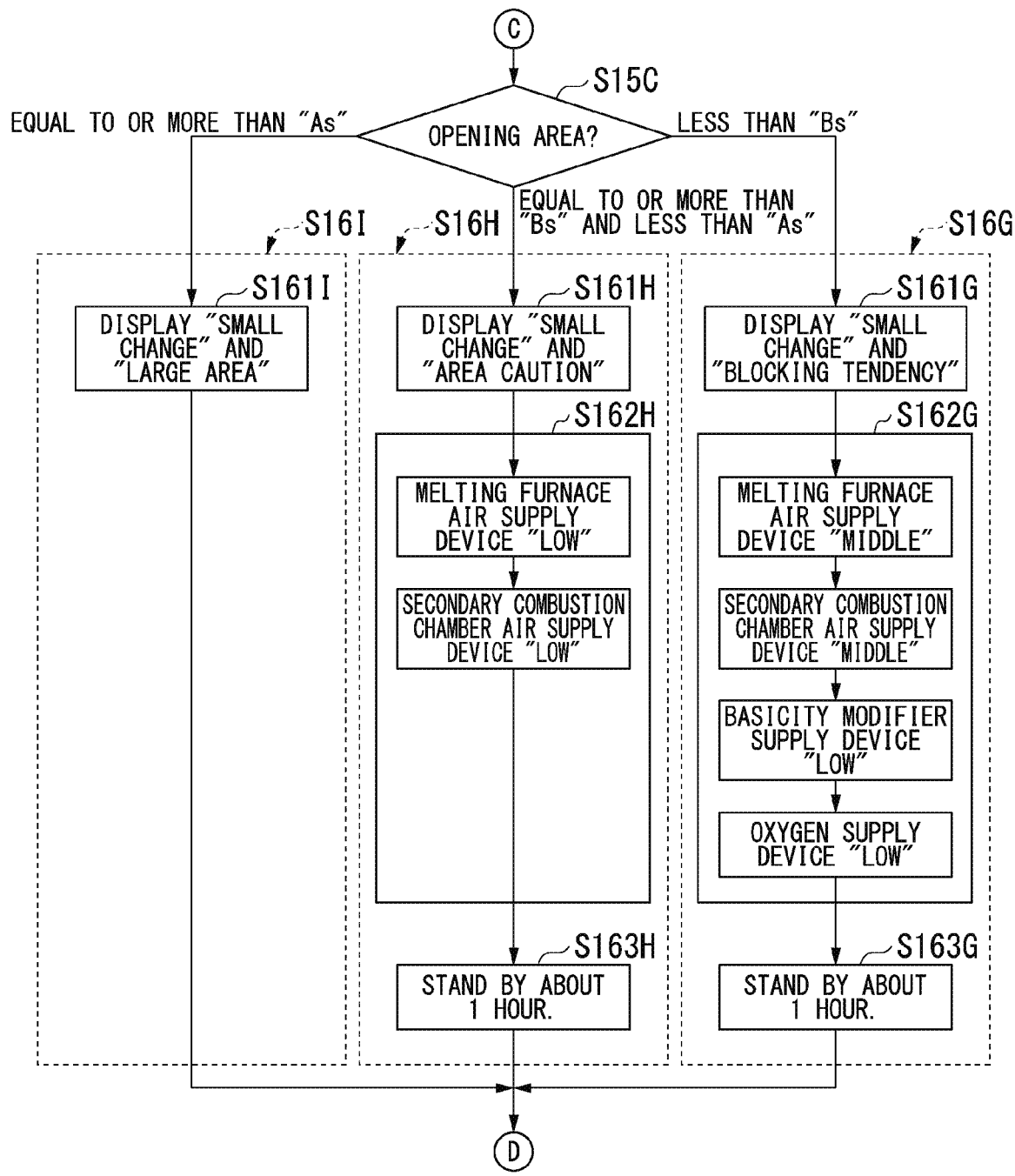
FIG. 8 is a flowchart illustrating a blocking prevention method for a gasification melting system using the first blocking prevention device of the embodiment of the invention.

Additionally, as illustrated in FIGS. 6, 7, and 8, the blocking prevention method for the gasification melting system 1 using the first blocking prevention device 11 has area determination steps S15 (a first area determination step S15A, a second area determination step S15B, and a third area determination step S15C) of determining on the basis of the opening area of the throat part 16, and slag adhesion prevention steps S16A to S16I of controlling of the display device 41 and the slag adhesion prevention device 13 on the basis of the determination step.

The slag adhesion prevention steps S16A to S16I have display steps S161A to S161I of controlling the display device 41 on the basis of the opening area of the throat part 16 and the change rate of the opening area, and prevention device control steps S162A to S162I (S162I is not illustrated in FIGS. 6, 7, and 8) of controlling of the slag adhesion prevention device 13, and standby steps S163A to S163H.

As described above, the blocking prevention method of the gasification melting system 1 to control the slag adhesion prevention device 13 and the display device 41 is performed on the basis of the opening area of the throat part 16 and the change rate of the opening area.

Specifically, the control of making the slag adhesion prevention capability of the slag adhesion prevention device 13 high in a case where the change rate of the opening area of the throat part 16 is large and making the slag adhesion prevention capability of the slag adhesion prevention device 13 low in a case where the change rate of the opening area of the throat part 16 is small is performed. Additionally, the control of making the slag adhesion prevention capability of the slag adhesion prevention device 13 high in a case where the opening area of the throat part 16 is small and making the slag adhesion prevention capability of the slag adhesion prevention device 13 low in a case where the opening area of the throat part 16 is large is performed.

[Threshold-Setting Step]

The threshold-setting step S11 is a step of setting a threshold serving as a reference for control in the blocking prevention method of the gasification melting system 1. In the threshold-setting step S11, an operator sets thresholds of the opening area of the throat part 16 and the change rate of the opening area on the basis of past results or the like.

Figure 9:
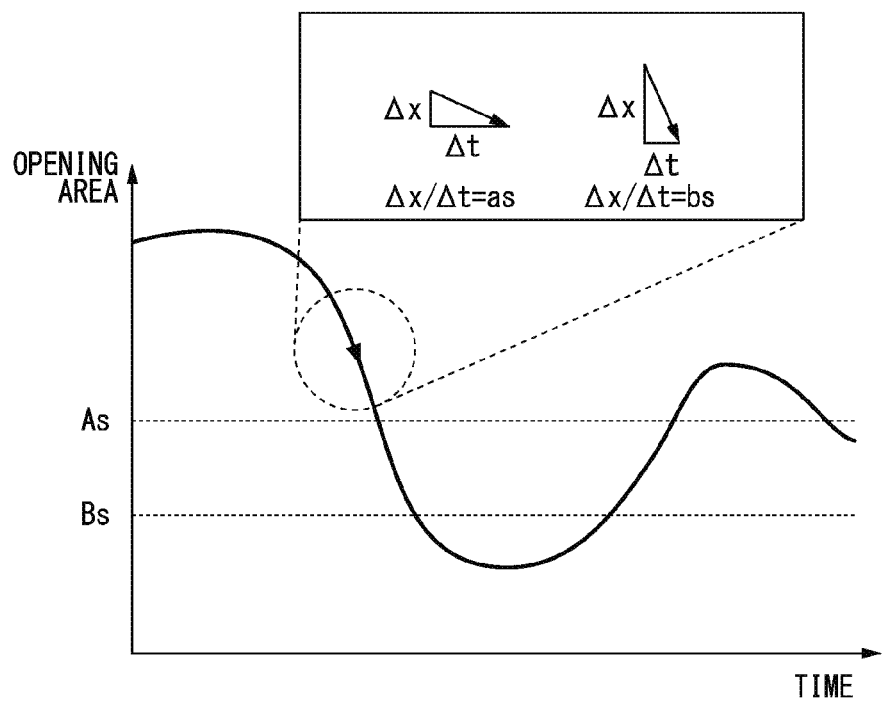
FIG. 9 is a graph illustrating changes over time in the opening area of the throat part of the melting furnace.

FIG. 9 is a graph illustrating changes over time of the opening area of the throat part 16 with a horizontal axis representing time and a vertical axis representing the opening area.

First, an area "As" (a second opening area) and an area "Bs" (a first opening area) are set as a threshold of the opening area of the throat part 16.

The area "As" and the area "Bs" are smaller than the maximum area (the opening area of the throat part 16 in a state where the slag does not adhere at all) of the throat part 16. The area "As" is an area larger than the area "Bs", and can be set to, for example, half of the maximum area of the throat part 16.

The area "Bs" is an area smaller than the area "As", and for example, the area "Bs" can be set to ⅔ times the area "As".

Next, a change rate "as" (a second change rate) and a change rate "bs" (a first change rate) are set as a threshold of the change rate of the opening area. If the time is "t" and the opening area is "x", the change rate can be calculated by $\Delta x/\Delta t$.

The change rate "as" is gentler than the change rate "bs". That is, an absolute value of "as" is smaller than an absolute value of "bs".

The change rate "bs" is rapider than the change rate "as". For example, the change rate "bs" can be set to 4 times the change rate "as".

[Imaging Step]

The imaging step S12 is a step of imaging the throat part 16 from above by using the first imaging device 39. In the imaging step S12, a video (moving image) of the throat part 16 and an image of the throat part 16 are input to the control device 50.

[Calculation Step]

The calculation step S13 is a step of calculating the opening area of the throat part 16 and the change rate of the opening area on the basis of the information captured in the imaging step S12.

In the calculation step S13, the calculation unit 51 of the control device 50 calculates the opening area of the throat part 16 on the basis of the image of the throat part 16 captured by the first imaging device 39. Additionally, in the calculation step, the calculation unit 51 of the control device 50 calculates the change rate of the opening area by analyzing a video captured by an imaging device. The calculation unit 51 may calculate the speed change of opening area by analyzing a plurality of images with different capturing times.

[Change Rate Determination Step]

The change rate determination step S14 is a step of determining on the change rate of the opening area.

The control device 50 determines whether or not the absolute value of the change rate of the opening area is equal to or more than "bs", whether or not the absolute value of the change rate of the opening area is equal to or more than "as" and less than "bs", and whether or not the absolute value of the change rate of the opening area is less than "as".

[First Area Determination Step]

As a result of this determination, in a case where the absolute value of the change rate of the opening area is determined to be equal to or more than "bs", that is, in a case where the change rate is determined to be rapid, the control device 50 executes the first area determination step S15A among the plurality of area determination steps.

As illustrated in FIG. 6, in the first area determination step S15A, the control device 50 determines whether or not the opening area is less than "Bs", whether or not the opening area is equal to or more than "Bs" and less than "As", and whether or not the opening area is equal to or more than "As".

[First Slag Adhesion Prevention Step]

As a result of this determination, in a case where the opening area is determined to be less than "Bs", a first slag adhesion prevention step S16A among the plurality of slag adhesion prevention steps is performed. In the first slag adhesion prevention step S16A, the slag adhesion prevention capabilities of the plurality of slag adhesion prevention devices 13 are set to be the highest.

In the display step S161A of the first slag adhesion prevention step S16A, the display control unit 53 of the control device 50 displays "blocking is progressing" (red) and "blocking tendency" (red) on the display device 41. That is, a display for alerting to the fact that the blocking of the throat part 16 is proceeding and the throat part 16 is already in a blocking tendency is performed. Additionally, the display control unit 53 can also change colors of texts. In the present embodiment, red is adopted as the color for indicating that a caution is most required. In the present embodiment, yellow is adopted as the color for indicating that a caution is required next to the red. In the present embodiment, particularly in a case where no caution is required, blue is adopted. In addition, texts may not be colored, or alerting may be performed only in colors like signals.

Next, the control device 50 performs a prevention device control step S162A. In the prevention device control step S162A of the first slag adhesion prevention step S16A, the prevention device control unit 52 of the control device 50 controls the plurality of slag adhesion prevention devices 13 as follows.

(1) The melting furnace air supply device 31 functioning as a slag adhesion prevention device 13 is operated with the "highest" slag adhesion prevention capability. That is, the combustion air to be supplied to the vertical swirling melting furnace 15 is reduced most.

(2) The secondary combustion chamber air supply device 32 functioning as a slag adhesion prevention device 13 is operated with the "highest" slag adhesion prevention capability. That is, the combustion air to be supplied to the secondary combustion chamber 17 is increased most.

(3) The basicity modifier supply device 42 functioning as a slag adhesion prevention device 13 is operated with the "high" slag adhesion prevention capability. That is, the basicity modifier to be supplied to the melting furnace 4 is increased most.

(4) The oxygen supply device 45 functioning as a slag adhesion prevention device 13 is operated with the "high" slag adhesion prevention capability. That is, the oxygen to be supplied to the melting furnace 4 is increased most.

Accordingly, the adhesion of the slag in the throat part 16 is suppressed.

Next, the control device 50 performs a standby step S163A of standing by for 8 minutes to 12 minutes.

After the above steps are executed, the process returns to the imaging step S12 of the flow illustrated in FIG. 5.

[Second Slag Adhesion Prevention Step]

In the first area determination step S15A, in a case where the opening area is determined to be equal to or more than "Bs" and less than "As", the control device 50 performs a second slag adhesion prevention step S16B. In the display step S161B of the second slag adhesion prevention step S16B, the display control unit 53 of the control device 50 displays "blocking is progressing" (red) and "area caution" (yellow) on the display device 41. That is, the blocking of the throat part 16 is proceeding, and a display for alerting to the area of the throat part 16 is performed.

In a second prevention device control step S162B, the prevention device control unit 52 of the control device 50 controls the plurality of slag adhesion prevention devices 13 as follows.

(1) The melting furnace air supply device 31 functioning as a slag adhesion prevention device 13 is operated with the "high" slag adhesion prevention capability.

(2) The secondary combustion chamber air supply device 32 functioning as a slag adhesion prevention device 13 is operated with the "high" slag adhesion prevention capability.

(3) The basicity modifier supply device 42 functioning as a slag adhesion prevention device 13 is operated with the "middle" slag adhesion prevention capability.

(4) The oxygen supply device 45 functioning as a slag adhesion prevention device 13 is operated with the "middle" slag adhesion prevention capability.

Next, the control device 50 performs a standby step S163B of standing by for 8 minutes to 12 minutes.

After the above steps are executed, the process returns to the imaging step S12 of the flow illustrated in FIG. 5.

[Third Slag Adhesion Prevention Step]

In the first area determination step S15A, in a case where the opening area is determined to be equal to or more than "As", a third slag adhesion prevention step S16C is executed.

In the display step S161C of the third slag adhesion prevention step S16C, the display control unit 53 of the control device 50 displays "blocking is progressing" (red) and "large area" (blue) on the display device 41. That is, although the area of the throat part 16 is large, a display for alerting to the fact that the blocking of the throat part 16 is proceeding is performed.

In a prevention device control step S162C, the prevention device control unit 52 of the control device 50 operates the plurality of slag adhesion prevention devices 13 with the "middle" slag adhesion prevention capability.

Next, the control device 50 performs a standby step S163C of standing by for 8 to 12 minutes. After the above steps are executed, the process returns to the imaging step S12 of the flow illustrated in FIG. 5.

[Second Area Determination Step]

As illustrated in FIG. 7, as a result of the determination in the change rate determination step S14, in a case where the absolute value of the change rate of the opening area is determined to be equal to or more than as and less than "bs", the second area determination step S15B is executed.

In the second area determination step S15B, the control device 50 determines whether or not the opening area is less than "Bs", whether or not the opening area is equal to or more than "Bs" and less than "As", and whether or not the opening area is equal to or more than "As", similarly to the first area determination step S15A.

As a result of this determination, in a case where the opening area is determined to be less than "Bs", a fourth slag adhesion prevention step S16D is performed.

[Fourth Slag Adhesion Prevention Step]

In the display step S161D of the fourth slag adhesion prevention step S16D, the display control unit 53 of the control device 50 displays "change caution" (yellow) and "blocking tendency" (red) on the display device 41. That is, the throat part 16 is already in a blocking tendency, and a display for alerting to a change in the blocking area of the throat part 16 is performed.

In a prevention device control step S162D, the prevention device control unit 52 of the control device 50 operates the plurality of slag adhesion prevention devices 13 with the "middle" slag adhesion prevention capability.

Next, the control device 50 performs a standby step S164D of standing by for 8 to 12 minutes.

After the above steps are executed, the process returns to the imaging step S12 of the flow illustrated in FIG. 5.

[Fifth Slag Adhesion Prevention Step]

In the second area determination step S15B, in a case where the opening area is determined to be equal to or more than "Bs" and less than "As", a fifth slag adhesion prevention step S16E is performed.

In the display step S161E of the fifth slag adhesion prevention step S16E, the display control unit 53 of the control device 50 displays "change caution" (yellow) and "area caution" (yellow) on the display device 41.

In a prevention device control step S162E, the prevention device control unit 52 of the control device 50 operates the melting furnace air supply device 31 with the "middle" slag adhesion prevention capability. Additionally, the prevention device control unit 52 of the control device 50 operates the secondary combustion chamber air supply device 32 with the "middle" slag adhesion prevention capability.

In the prevention device control step S162E of the fifth slag adhesion prevention step S16E, the basicity modifier supply device 42 and the oxygen supply device 45 are not operated.

Next, the control device 50 performs a standby step S163E of standing by for 25 minutes to 30 minutes.

After the above steps are executed, the process returns to the imaging step S12 of the flow illustrated in FIG. 5.

[Sixth Slag Adhesion Prevention Step]

In the second area determination step S15B, in a case where the opening area is determined to be equal to or more than "As", a sixth slag adhesion prevention step S16F is executed.

In the display step S161F of the sixth slag adhesion prevention step S16F, the display control unit 53 of the control device 50 displays "change caution" (yellow) and "large area" (blue) on the display device 41.

In a prevention device control step S162F, the prevention device control unit 52 of the control device 50 operates the melting furnace air supply device 31 and the second combustion chamber air supply device 32 with the "low" slag adhesion prevention capability.

In the prevention device control step S162F of the sixth slag adhesion prevention step S16F, the basicity modifier supply device 42 and the oxygen supply device 45 are not operated.

Next, the control device 50 performs a standby step S163F of standing by for 25 minutes to 30 minutes.

After the above steps are executed, the process returns to the imaging step S12 of the flow illustrated in FIG. 5.

[Third Area Determination Step]

As illustrated in FIG. 8, as a result of the determination in the change rate determination step S14, in a case where the absolute value of the change rate of the opening area is determined to be less than "as", the third area determination step S15C is executed.

In the third area determination step S15C, the control device 50 determines whether or not the opening area is less than "Bs", whether or not the opening area is equal to or more than "Bs" and less than "As", and whether or not the opening area is equal to or more than "As", similarly to the first area determination step S15A.

As a result of this determination, in a case where the opening area is determined to be less than "Bs", a seventh slag adhesion prevention step S16G is performed.

[Seventh Slag Adhesion Prevention Step]

In the display step S161G of the seventh slag adhesion prevention step S16G, the display control unit 53 of the control device 50 displays "small change" (blue) and "blocking tendency" (red) on the display device 41. That is, a display is performed for alerting to the fact that the change in the blocking area of the throat part 16 is small, although the throat part 16 is already in a blocking tendency.

In a prevention device control step S162G of the seventh slag adhesion prevention step S16G, the prevention device control unit 52 of the control device 50 operates the melting furnace air supply device 31 and the secondary combustion chamber air supply device 32 with the "middle" slag adhesion prevention capability. Additionally, the basicity modifier supply device 42 and the oxygen supply device 45 are operated with the "low" slag adhesion prevention capability.

Next, the control device 50 performs a standby step S163G of standing by for 50 minutes to 70 minutes.

After the above steps are executed, the process returns to the imaging step S12 of the flow illustrated in FIG. 5.

[Eighth Slag Adhesion Prevention Step]

In the third area determination step S15C, in a case where the opening area is determined to be equal to or more than "Bs" and less than "As", an eighth slag adhesion prevention step S16H is performed.

In the display step of the eighth slag adhesion prevention step S16H, the display control unit 53 of the control device 50 displays "small change" (blue) and "area caution" (yellow) on the display device 41.

In a prevention device control step S162H of the eighth slag adhesion prevention step S16H, the prevention device control unit 52 of the control device 50 operates the melting furnace air supply device 31 and the secondary combustion chamber air supply device 32 with the "low" slag adhesion prevention capability.

In the prevention device control step S162H of the eighth slag adhesion prevention step S16H, the basicity modifier supply device 42 and the oxygen supply device 45 are not operated.

Next, the control device 50 performs a standby step S163H of standing by for 50 minutes to 70 minutes.

After the above steps are executed, the process returns to the imaging step S12 of the flow illustrated in FIG. 5.

[Ninth Slag Adhesion Prevention Step]

In the third area determination step S15C, in a case where the opening area is determined to be equal to or more than "As", a ninth slag adhesion prevention step S16I is executed.

In the display step S161I of the ninth slag adhesion prevention step S16I, the display control unit 53 of the control device 50 displays "small change" (blue) and "large area" (blue) on the display device 41.

In a prevention device control step S162I of the ninth slag adhesion prevention step S16I, the prevention device control unit 52 of the control device 50 returns to the imaging step S12 of the flow illustrated in FIG. 5 without operating all the slag adhesion prevention devices 13.

As described above, according to the blocking prevention method for the gasification melting system 1 using the first blocking prevention device 11, the slag adhesion prevention capabilities of the plurality of slag adhesion prevention devices 13 are changed on the basis of the change rate of the opening area of the throat part 16. Accordingly, in a case where the blocking of the throat part 16 proceeds suddenly, the blocking can be predicted early, slag adhesion prevention work can be started, and the throat part 16 can be prevented from being blocked.

[Second Blocking Prevention Device]

Hereinafter, the second blocking prevention device 12, which prevents the blocking of the slag outlet part 20 of the melting furnace 4, will be described. In addition, in the following description, differences from the above-described first blocking prevention device 11 will mainly be described, and description of the same portions will be omitted.

Figure 10:
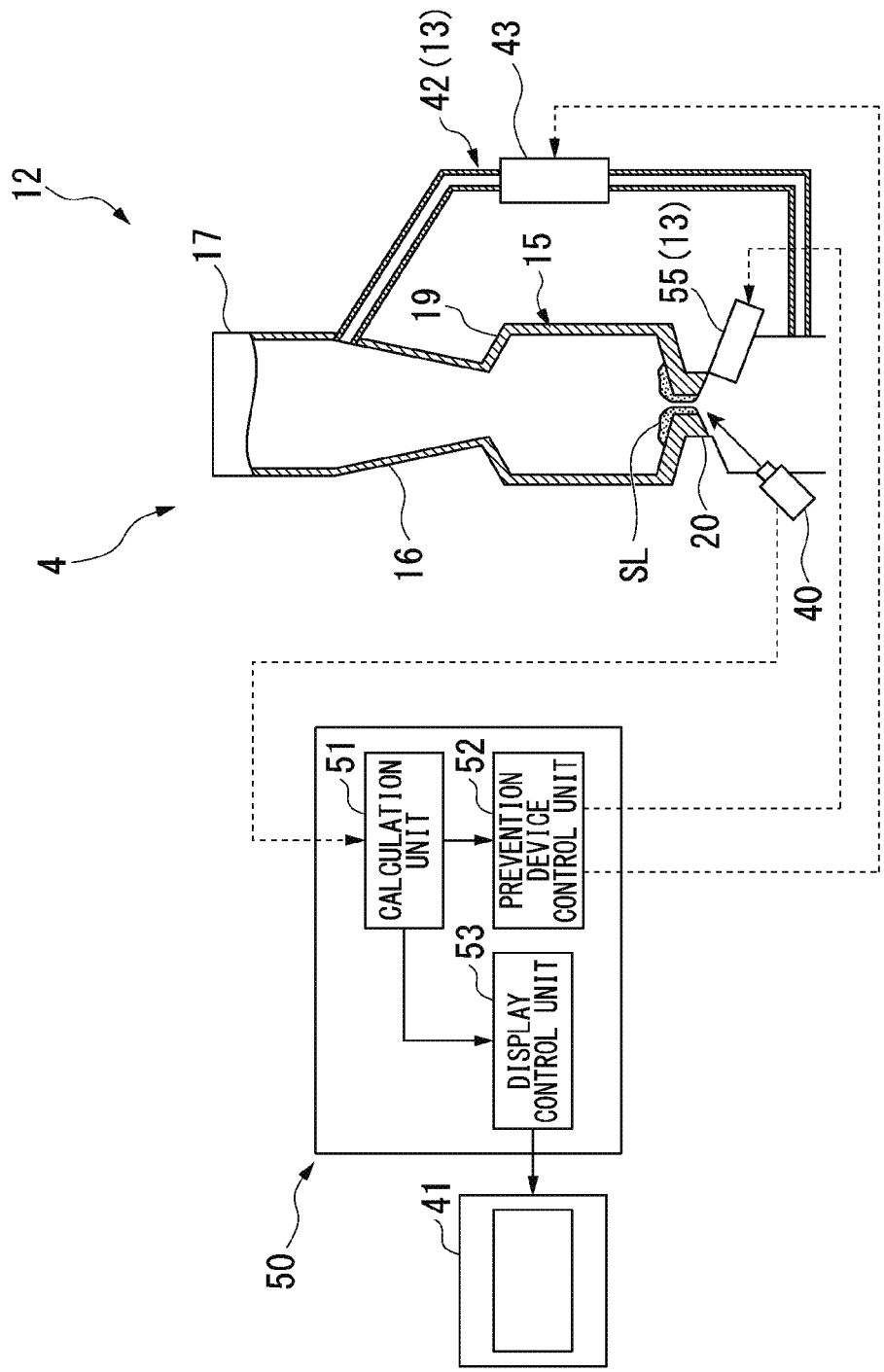
FIG. 10 is a schematic configuration view of a second blocking prevention device of the melting furnace and the gasification melting system of the embodiment of the invention.

As illustrated in FIG. 10, the second blocking prevention device 12 includes a second imaging device 40 provided at the bottom of the melting furnace 4, the burner device 55 that heats the slag outlet part 20, the display device 41 that displays a warning or the like in accordance with the state of the slag outlet part 20, and the control device 50.

Additionally, the second blocking prevention device 12 includes the plurality of the slag adhesion prevention devices 13 that prevent the adhesion of the slag in the slag outlet part 20 or remove the slag, similarly to the first blocking prevention device 11. The basicity modifier supply device 42 and the burner device 55 are devices that function as the slag adhesion prevention devices 13.

The second imaging device 40 is disposed so as to image an inner peripheral surface side of the cylindrical slag outlet part 20 obliquely from below.

Figure 11:
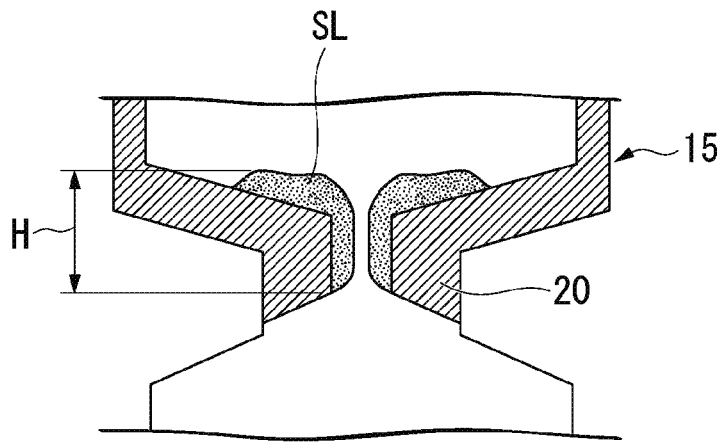
FIG. 11 is a side sectional view of a slag outlet part and is a schematic view illustrating the weir height of the slag outlet part.

The calculation unit 51 of the control device 50 calculates the opening area of the slag outlet part 20, the change rate of the opening area, and the weir height of the slag, using a video, or a plurality of images with different capturing times, captured by the second imaging device 40. As illustrated in FIG. 11, the weir height H of the slag is the height of the slag SL adhering to the slag outlet part 20. The weir height H of the slag can be a height from a predetermined position (for example, a lower end of an inner peripheral surface of the slag outlet part 20) of the slag outlet part 20 in an upward-downward direction to an upper end of the slag.

The prevention device control unit 52 of the control device 50 controls the plurality of slag adhesion prevention devices 13 in accordance with the opening area, the change rate of the opening area, and the weir height H of the slag.

The prevention device control unit 52 of the control device 50 can change the slag adhesion prevention capability of the basicity modifier supply device 42 of the second blocking prevention device 12 in four stages similarly to the melting furnace air supply device 31 of the first blocking prevention device 11.

The burner device 55 is a heating device that heats the slag outlet part 20 from below, and heats and dissolves the slag adhering to the slag outlet part 20. The burner device 55 is a burner capable of adjusting output, for example, such as a fuel oxygen burner. The fuel oxygen burner is capable of adjusting output depending on the amount of supply of the oxygen supplied from an oxygen cylinder.

The slag adhesion prevention capability of the burner device 55 is high in a case where the burner output of the burner device 55 is large, and is low in a case where the burner output of the burner device 55 is small. That is, as the burner output is increased, the slag adhering to the slag outlet part 20 is melted.

The prevention device control unit 52 of the control device 50 of the present embodiment can change the slag adhesion prevention capability of the burner device 55 in four stages, similarly to the basicity modifier supply device 42.

[Blocking Prevention Method Using Second Blocking Prevention Device]

Next, the blocking prevention method for the gasification melting system 1 using the second blocking prevention device 12 will be described. In addition, regarding the second blocking prevention device 12, differences from the above-described first blocking prevention device 11 will mainly be described, and description of the same portions will be omitted. For example, the description of the display steps S261A to S261I is omitted.

Figure 12:
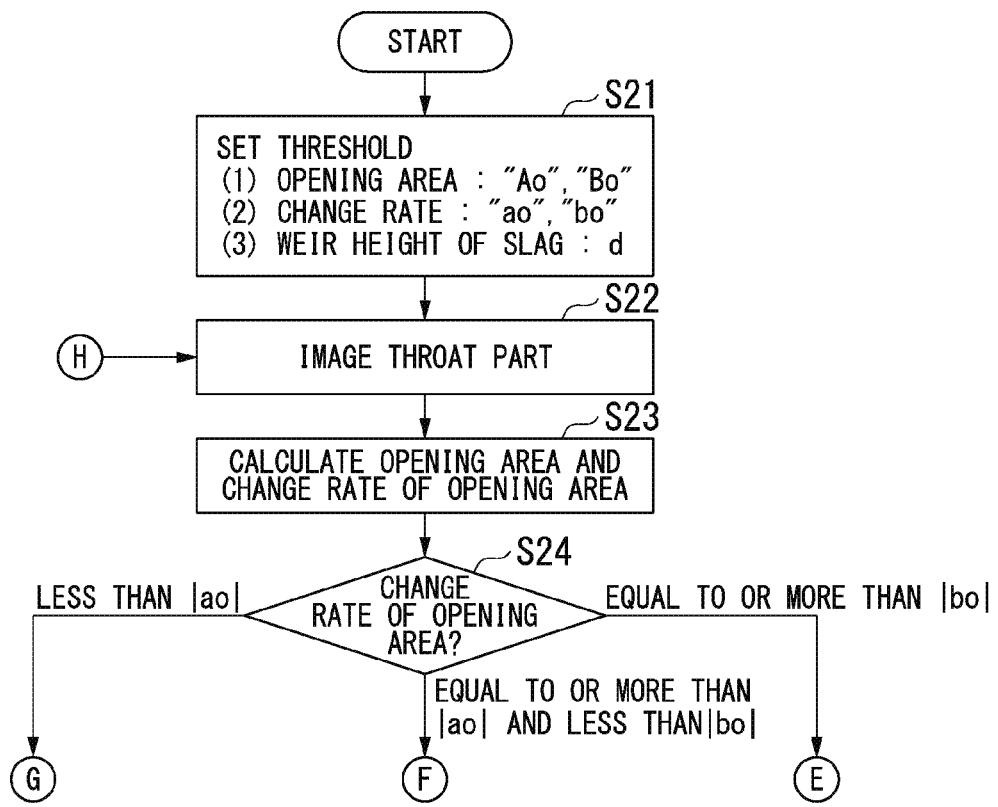
FIG. 12 is a flowchart that illustrates a blocking prevention method for a gasification melting system using the second blocking prevention device of the embodiment of the invention.

As illustrated in FIG. 12, a threshold-setting step S21 of the blocking prevention method using the second blocking prevention device 12, an imaging step S22, a calculation step S23, and a change rate determination step S24 are substantially the same as those of the blocking prevention method using the first blocking prevention device 11.

The blocking prevention method using the first blocking prevention device 11 and the blocking prevention method using the second blocking prevention device 12 are different from each other in the slag adhesion prevention steps S26 (from a first slag adhesion prevention step S26A to a ninth slag adhesion prevention step S26I).

Particularly, the blocking prevention method using the second blocking prevention device 12 has a weir height determination step S264I of changing the slag adhesion prevention capability of the slag adhesion prevention device 13 on the basis of the weir height H (refer to FIG. 11) of the slag in the ninth slag adhesion prevention step S26I.

[Threshold-Setting Step]

In the threshold-setting step S21 of the blocking prevention method using the second blocking prevention device 12, the operator sets the opening area of the slag outlet part 20, the threshold of the change rate of the opening area, and the threshold of the weir height of the slag on the basis of the past results or the like.

Figure 16:
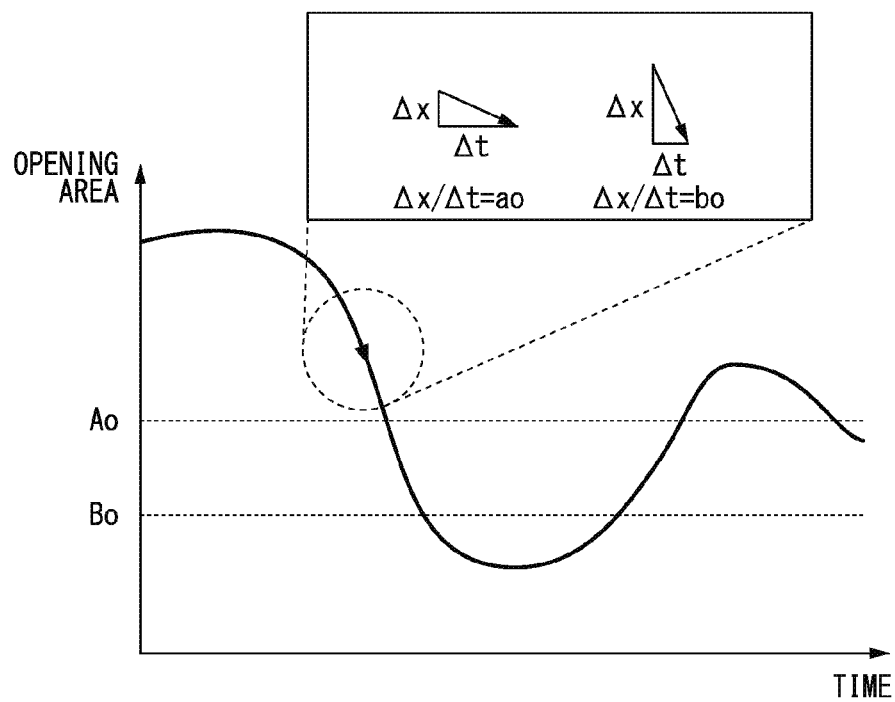
FIG. 16 is a graph illustrating changes over time in the opening area of the slag outlet part of the melting furnace.
Figure 17:
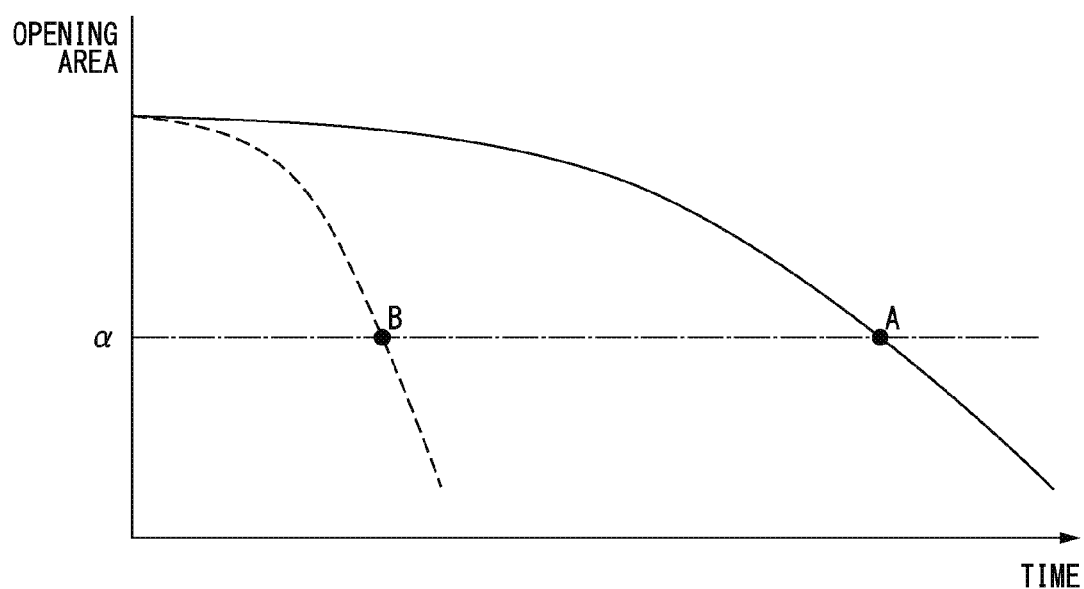
FIG. 17 is a graph illustrating changes over time in the opening area of the slag outlet part of the melting furnace.

FIG. 16 is a graph illustrating changes over time of the opening area of the slag outlet part 20 with a horizontal axis representing time and a vertical axis representing the opening area.

An area "Ao" and an area "Bo" are set as thresholds of the opening area of the slag outlet part 20. The setting method is the same as that of the blocking prevention method using the first blocking prevention device 11.

Additionally, a change rate "ao" and a change rate "bo" are set as the thresholds of the change rate of the opening area, similarly to the blocking prevention method using the first blocking prevention device 11.

Moreover, the operator sets a weir height "d" as the threshold of the weir height. The weir height "d" serving as the threshold is also set on the basis of the past results or the like.

[Change Rate Determination Step]

As illustrated in FIG. 12, in the change rate determination step S24, the control device 50 determines whether or not the absolute value of the change rate of the opening area is equal to or more than "bo", whether or not the absolute value of the change rate of the opening area is equal to or more than "ao" and less than "bo", and whether or not the absolute value of the change rate of the opening area is less than "ao".

[First Area Determination Step]

In a case where the absolute value of the change rate of the opening area is determined to be equal to or more than "bo", the control device 50 executes a first area determination step S25A.

Figure 13:
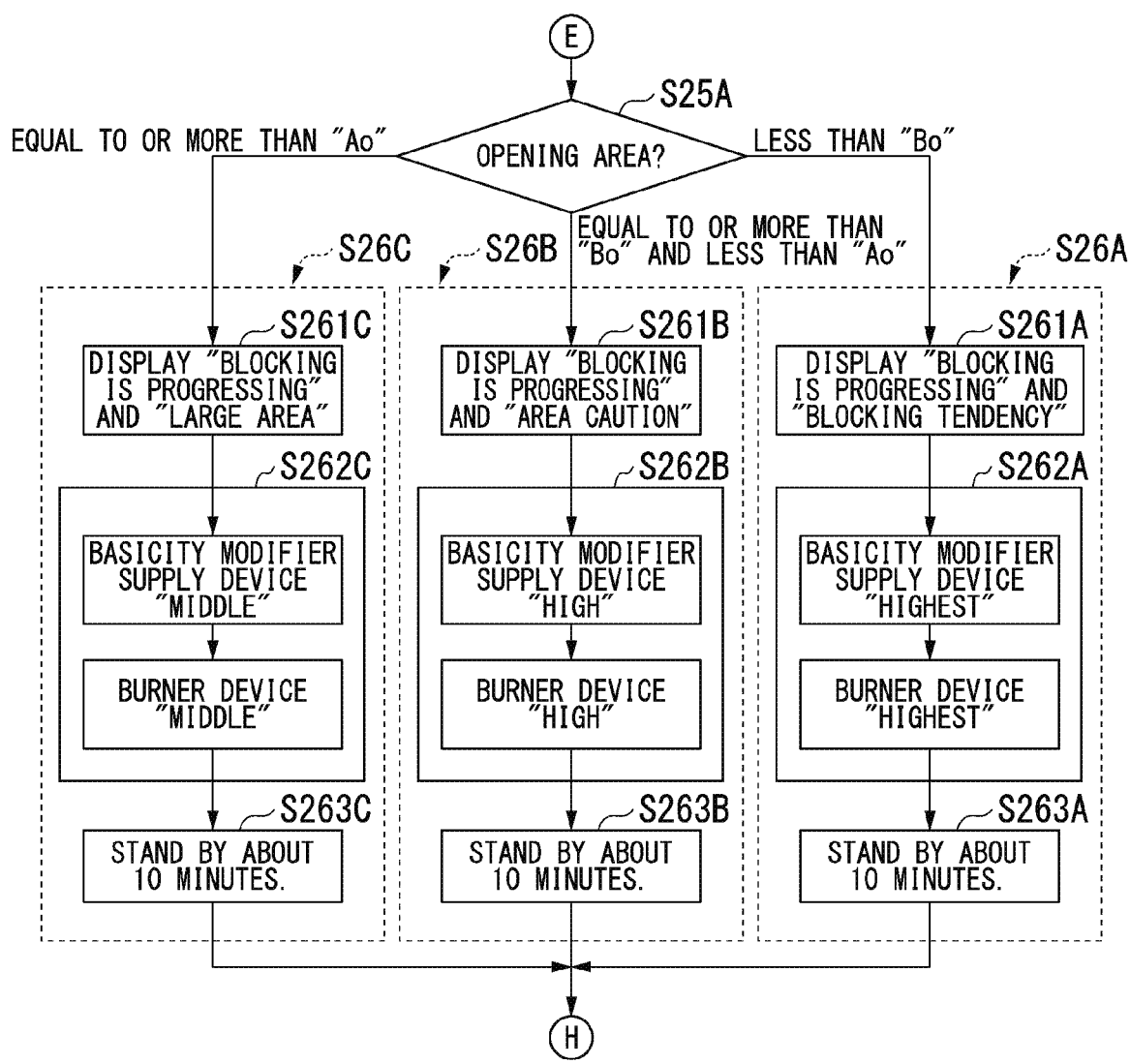
FIG. 13 is a flowchart illustrating a blocking prevention method for a gasification melting system using the second blocking prevention device of the embodiment of the invention.

As illustrated in FIG. 13, in the first area determination step S25A, the control device 50 determines whether or not the opening area is less than "Bo", whether or not the opening area is equal to or more than "Bo" and less than "Ao", and whether or not the opening area is equal to or more than "Ao".

The control device 50 executes the first slag adhesion prevention step S26A in a case where the opening area is determined to be less than "Bo", executes a second slag adhesion prevention step S26B in a case where the opening area is determined to be equal to or more than "Bo" and less than "Ao", and executes a third slag adhesion prevention step S26C in a case where the opening area is determined to be equal to or more than "Ao".

[First Slag Adhesion Prevention Step]

In a prevention device control step S262A of the first slag adhesion prevention step S26A, the prevention device control unit 52 of the control device 50 operates the basicity modifier supply device 42 with the "highest" slag adhesion prevention capability.

Additionally, the prevention device control unit 52 operates the burner device 55 with the "highest" slag adhesion prevention capability.

Accordingly, the adhesion of the slag in the slag outlet part 20 is prevented.

Next, the control device 50 performs a standby step S263A of standing by for 8 to 12 minutes.

After the above steps are executed, the process returns to the imaging step S22 of the flow illustrated in FIG. 12.

[Second Slag Adhesion Prevention Step]

In a prevention device control step S262B of the second slag adhesion prevention step S26B, the prevention device control unit 52 of the control device 50 operates the basicity modifier supply device 42 with the "high" slag adhesion prevention capability. Additionally, the prevention device control unit 52 operates the burner device 55 with the "high" slag adhesion prevention capability.

Next, the control device 50 executes the standby step S263B of standing by for 8 to 12 minutes.

After the above steps are executed, the process returns to the imaging step S22 of the flow illustrated in FIG. 12.

[Third Slag Adhesion Prevention Step]

In a prevention device control step S262C of the third slag adhesion prevention step S26C, the prevention device control unit 52 of the control device 50 operates the plurality of slag adhesion prevention devices 13 with the "middle" slag adhesion prevention capability. Next, the control device 50 executes a standby step S263C of standing by for 8 to 12 minutes. After the above steps are executed, the process returns to the imaging step S22 of the flow illustrated in FIG. 12.

[Second Area Determination Step]

In a case where the absolute value of the change rate of the opening area is equal to or more than "ao" and less than "bo", the control device 50 executes a second area determination step S25B.

Figure 14:
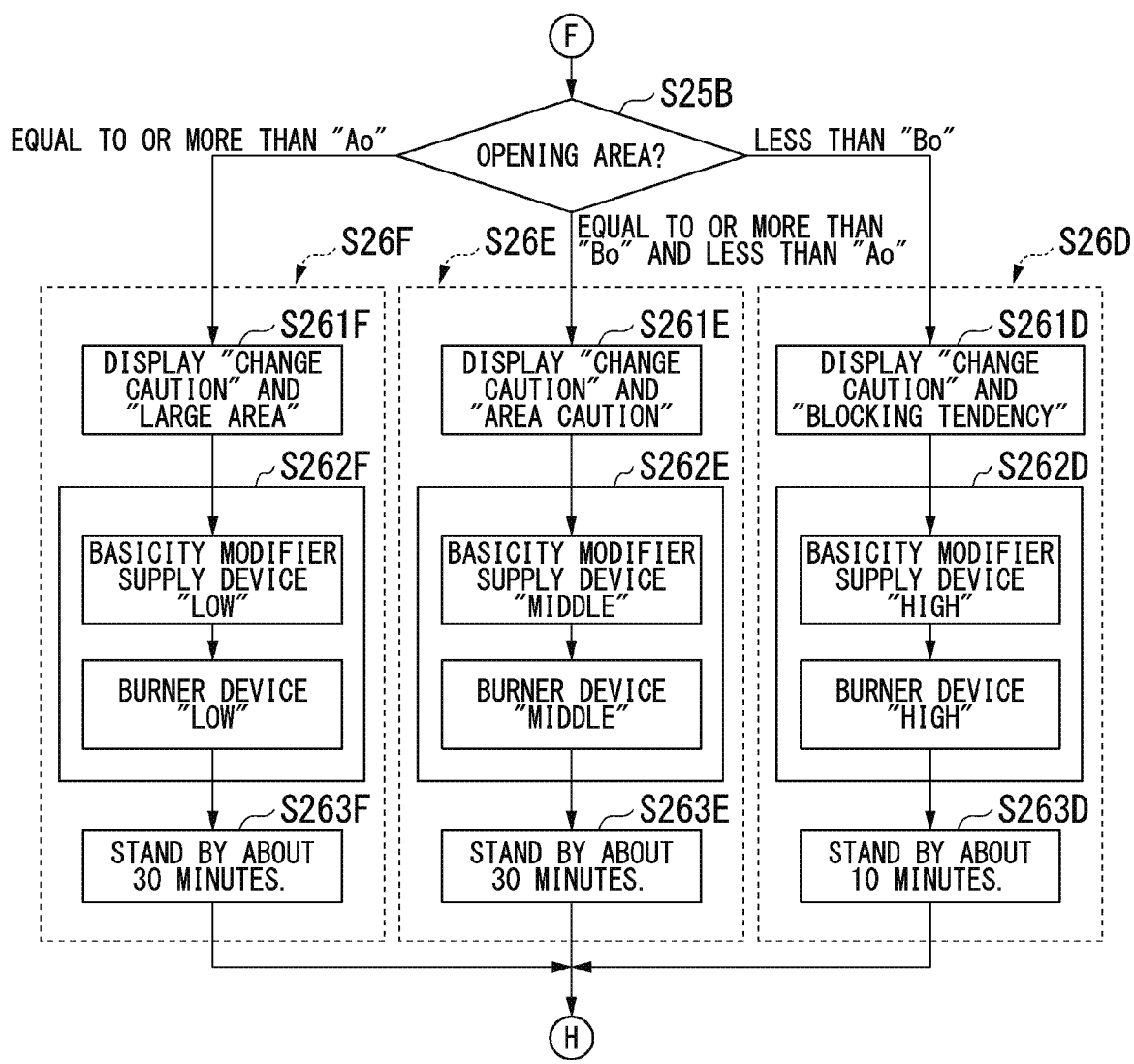
FIG. 14 is a flowchart illustrating a blocking prevention method for a gasification melting system using the second blocking prevention device of the embodiment of the invention.

As illustrated in FIG. 14, in the second area determination step S25B the control device 50 determines whether the opening area is less than "Bo", whether the opening area is equal to or more than "Bo" and less than "Ao", and whether or not the opening area is equal to or more than "Ao".

The control device 50 executes a fourth slag adhesion prevention step S26D in a case where the opening area is determined to be less than "Bo", executes a fifth slag adhesion prevention step S26E in a case where the opening area is determined to be equal to or more than "Bo" and less than "Ao", and executes a sixth slag adhesion prevention step S26F in a case where the opening area is determined to be equal to or more than "Ao".

[Fourth Slag Adhesion Prevention Step]

In a prevention device control step S262D of the fourth slag adhesion prevention step S26D, the prevention device control unit 52 of the control device 50 operates the plurality of slag adhesion prevention devices 13 with the "high" slag adhesion prevention capability.

Next, the control device 50 executes a standby step S263D of standing by for 8 to 12 minutes.

After the above steps are executed, the process returns to the imaging step S22 of the flow illustrated in FIG. 12.

[Fifth Slag Adhesion Prevention Step]

In a prevention device control step S262E of the fifth slag adhesion prevention step S26E, the prevention device control unit 52 of the control device 50 operates two slag adhesion prevention devices 13 with the "middle" slag adhesion prevention capability.

Next, the control device 50 performs a standby step S263E of standing by for 25 minutes to 30 minutes.

After the above steps are executed, the process returns to the imaging step S22 of the flow illustrated in FIG. 12.

[Sixth Slag Adhesion Prevention Step]

In a prevention device control step S262F of the sixth slag adhesion prevention step S26F, the prevention device control unit 52 of the control device 50 operates two slag adhesion prevention devices 13 with the "low" slag adhesion prevention capability.

Next, the control device 50 performs a standby step S263F of standing by for 25 minutes to 30 minutes.

After the above steps are executed, the process returns to the imaging step S22 of the flow illustrated in FIG. 12.

[Third Area Determination Step]

In a case where the absolute value of the change rate of the opening area is determined to be less than "ao", the control device 50 executes a third area determination step S25C.

Figure 15:
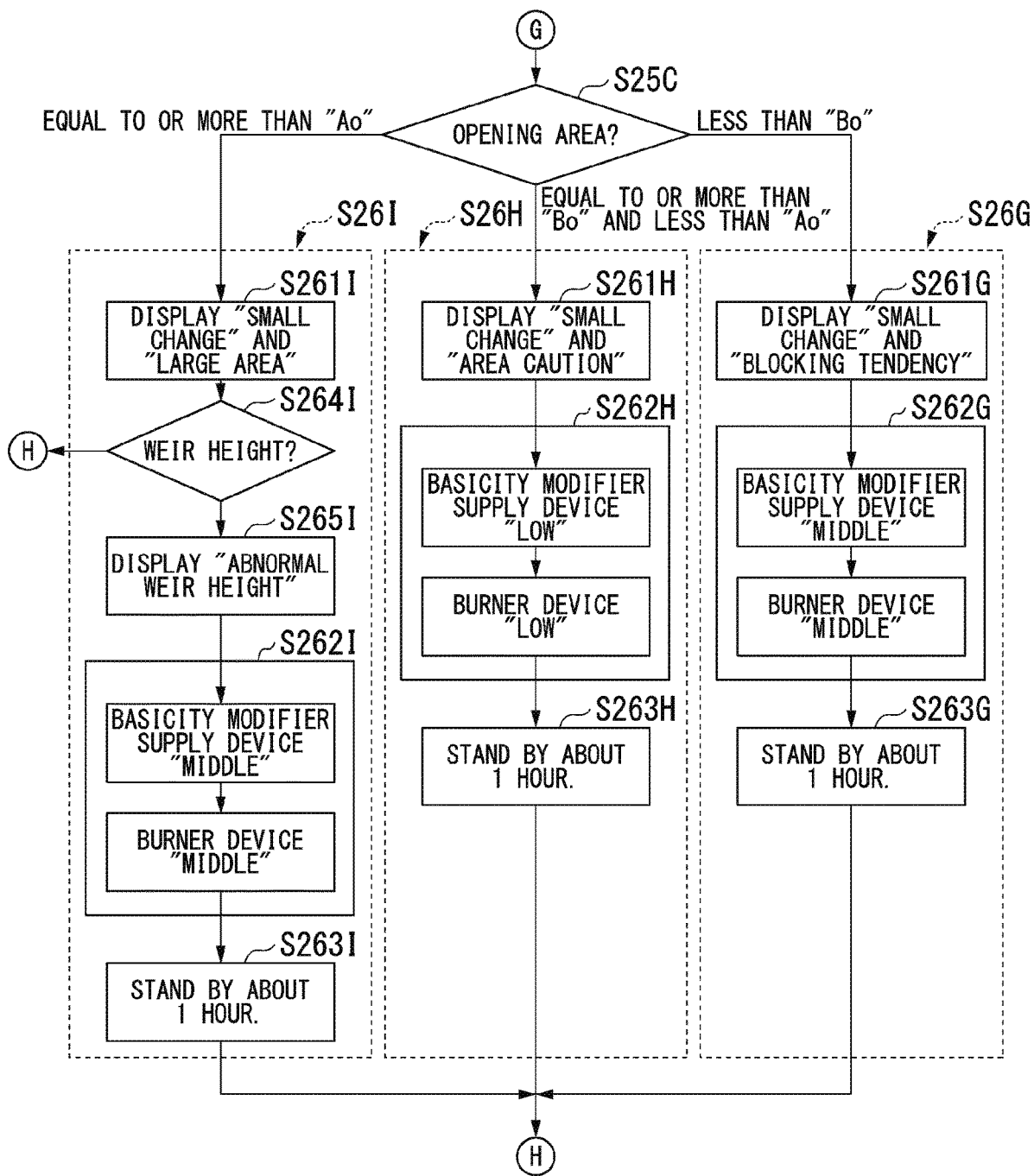
FIG. 15 is a flowchart illustrating a blocking prevention method for a gasification melting system using the second blocking prevention device of the embodiment of the invention.

As illustrated in FIG. 15, in the third area determination step S25C, the control device 50 determines whether or not the opening area is less than "Bo", whether or not the opening area is equal to or more than "Bo" and less than "Ao", and whether or not the opening area is equal to or more than "Ao".

The control device 50 executes a seventh slag adhesion prevention step S26G in a case where the opening area is determined to be less than "Bo", executes an eighth slag adhesion prevention step S26H in a case where the opening area is determined to be equal to or more than "Bo" and less than "Ao", and executes a ninth slag adhesion prevention step S26I in a case where the opening area is determined to be equal to or more than "Ao".

[Seventh Slag Adhesion Prevention Step]

In a prevention device control step S262G of the seventh slag adhesion prevention step S26G, the prevention device control unit 52 of the control device 50 operates two slag adhesion prevention devices 13 with the "middle" slag adhesion prevention capability.

Next, the control device 50 performs a standby step S263G of standing by for 50 minutes to 70 minutes.

After the above steps are executed, the process returns to the imaging step S22 of the flow illustrated in FIG. 12.

[Eighth Slag Adhesion Prevention Step]

In a prevention device control step S262H of the eighth slag adhesion prevention step S26H, the prevention device control unit 52 of the control device 50 operates two slag adhesion prevention devices 13 with the "low" slag adhesion prevention capability.

Next, the control device 50 performs a standby step S263H of standing by for 50 minutes to 70 minutes.

After the above steps are executed, the process returns to the imaging step S22 of the flow illustrated in FIG. 12.

[Ninth Slag Adhesion Prevention Step]

The ninth slag adhesion prevention step S26I has a display step S261I, a weir height determination step S264I, a weir height display step S265I, a prevention device control step S262I, and a standby step S263I.

[Weir Height Determination Step]

The weir height determination step S264I is a step of performing determination on the weir height of the slag adhering to the slag outlet part 20.

The control device 50 determines whether the weir height of the slag is equal to or more than "d" and less than "d". "d" is set to, for example, 30 mm.

In a case where the weir height of the slag is less than d mm, that is, in a case where the weir height of the slag is determined to be normal, the process returns to the imaging step S22 of the flow illustrated in FIG. 12.

In a case where the weir height of the slag is equal to or more than "d", that is, in a case where the weir height of the slag is determined to be abnormal, the display control unit 53 of the control device 50 displays as "abnormal weir height" (red) on the display device 41 (weir height display step S265I).

Next, the control device 50 executes the ninth prevention device control step S262I. In the prevention device control step S262I of the ninth slag adhesion prevention step S26I, the prevention device control unit 52 of the control device 50 operates the basicity modifier supply device 42 with the "middle" slag adhesion prevention capability. Additionally, the prevention device control unit 52 operates the burner device 55 with the "middle" slag adhesion prevention capability.

Next, the control device 50 performs the standby step S263I of standing by for 50 minutes to 70 minutes. After the above steps are executed, the process returns to the imaging step S22 of the flow illustrated in FIG. 12.

According to the above embodiment, the slag adhesion prevention capability of the slag adhesion prevention device 13 is changed on the basis of the change rate of the opening area of the throat part 16 or the slag outlet part 20 that is an opening part. Accordingly, even in a case where the blocking of the opening part proceeds suddenly, the blocking can be predicted early, the slag adhesion prevention work can be started, and the opening part can be prevented from being blocked. Additionally, by controlling the slag adhesion prevention device 13 with the control device 50, the prevention of the blocking can be reliably performed regardless of differences in human experience.

Additionally, the prevention device control unit 52 changes the slag adhesion prevention capabilities of the plurality of slag adhesion prevention devices 13 on the basis of the opening area in addition to the change rate of the opening area. That is, by performing control with reference to the opening area in addition to the change rate of the opening area, it is possible to cope with even a case where the change rate is slow but the opening area is small.

Additionally, by increasing the amount of supply of the combustion air CA2 to be supplied to the secondary combustion chamber 17 using the secondary combustion chamber air supply device 32 of the first blocking prevention device 11 and raising the temperature of the secondary combustion chamber 17, the slag adhering to the throat part 16 can be melted and made to flow.

Additionally, the basicity of the slag becomes high by supplying the basicity modifier using the basicity modifier supply device 42 of the first blocking prevention device 11. As a result, the melting point of the slag rises, the viscosity thereof becomes low, and the slag can be made to flow.

The pyrolysis gas ducts 21 are provided under the throat part 16 such that pyrolysis gas PG becomes an upward flow with respect to the throat part 16. Accordingly, dust contained in the pyrolysis gas PG is melted in the melting furnace body part 24, and dust which is contained in the pyrolysis gas PG and introduced into the secondary combustion chamber 17 is markedly reduced. Thus, an image captured from the top of the furnace can be made clearer.

Additionally, since the temperature at the installation location of the first imaging device 39 is lower than the temperature below the throat part 16, the first imaging device 39 can be installed at a lower cost.

Additionally, by increasing the burner output of the burner device 55 of the second blocking prevention device 12, the slag adhering to the slag outlet part 20 can be melted and can be made to flow.

Additionally, by supplying the basicity modifier using the basicity modifier supply device 42 of the second blocking prevention device 12, the basicity of the slag becomes high. Accordingly, the melting point of the slag rises, the viscosity becomes low, and the slag can be made to flow.

Additionally, the prevention device control unit 52 of the second blocking prevention device 12 changes the slag adhesion prevention capabilities of the plurality of slag adhesion prevention devices 13 on the basis of the weir height. Accordingly, in a case where there is no abnormality in the change rate of the opening area and the opening area but the weir height is abnormal, the adhesion of the slag can be prevented.

Additionally, by making the display device 41 display texts or colors corresponding to the opening area or the change rate, the operator can easily recognize the blocking situation of the opening part.

Although the embodiment of the invention has been described in detail with reference to the drawings, a specific configuration is not limited to the embodiment, and design changes are also included without departing from the scope of the invention.

In addition, in the above embodiment, a configuration in which the blocking prevention control is performed in consideration of the opening area in addition to the speed change of the opening area is adopted. However, the invention is not limited to this. A configuration in which control is performed only in consideration of the speed change of the opening area may be adopted.

REFERENCE SIGNS LIST

1: gasification melting system
2: gasification furnace
3: pyrolysis gas passage
4: melting furnace
5: gasification furnace body
6: waste input port
6a: waste discharge device
7: incombustibles discharge port
8: fluid medium
11: first blocking prevention device
12: second blocking prevention device
13: slag adhesion prevention device
15: vertical swirling melting furnace
15a: furnace wall
16: throat part
17: secondary combustion chamber
18: boiler unit
19: exhaust gas outlet
20: slag outlet part
21: pyrolysis gas duct
23: pyrolysis gas discharge port
30: combustion air supply device
31: melting furnace air supply device
32: secondary combustion chamber air supply device
33: blower
34: melting furnace air supply pipe
35: melting furnace air volume-adjusting valve
36: secondary combustion chamber air supply pipe
37: secondary combustion chamber air volume-adjusting valve
39: first imaging device
40: second imaging device
41: display device
42: basicity modifier supply device
44: basicity modifier supply pipe
45: oxygen supply device
46: first oxygen supply device
47: second oxygen supply device 48: oxygen supply device body
49: oxygen supply pipe
50: control device
51: calculation unit
52: prevention device control unit
53: display control unit
55: burner device
PG: pyrolysis gas
W1: waste

The invention claimed is:

1. A blocking prevention device for a gasification melting system that combusts and melts an object to be treated into a slag in a melting furnace after the object to be treated is converted into pyrolysis gas in a gasification furnace, the blocking prevention device comprising:
   a plurality of slag adhesion prevention devices that has a slag adhesion prevention capability for preventing adhesion of the slag at an opening part that may be blocked due to the adhesion of the slag;
   an imaging device that captures an image of the opening part; and
   a control device including a calculation unit that calculates a change rate of an opening area of the opening part, using a plurality of images with different capturing times or a video, captured by the imaging device, and a prevention device control unit that changes slag adhesion prevention capabilities of the plurality of slag adhesion prevention devices in accordance with the change rate,
   wherein the prevention device control unit changes slag adhesion prevention capabilities of the plurality of slag adhesion prevention devices on a basis of the opening area and the change rate,
   wherein the prevention device control unit operates all the plurality of slag adhesion prevention devices with a first slag adhesion prevention capability higher than a predetermined slag adhesion prevention capability in a case where the change rate is larger than a first change rate and the opening area is smaller than a first opening area, and operates all the plurality of slag adhesion prevention devices with a second slag adhesion prevention capability lower than the predetermined slag adhesion prevention capability in a case where the change rate is larger than the first change rate and the opening area is larger than a second opening area which is larger than the first opening area.

2. The blocking prevention device for a gasification melting system according to claim 1,
   wherein the prevention device control unit operates at least some of the slag adhesion prevention devices with a slag adhesion prevention capability that is lower than the first slag adhesion prevention capability and higher than the second slag adhesion prevention capability in a case where the change rate is larger than the first change rate, and the opening area is larger than the first opening area and smaller than the second opening area.

3. The blocking prevention device for a gasification melting system according to claim 1,
   wherein the prevention device control unit does not operate at least some of the slag adhesion prevention devices in a case where the change rate is smaller than a second change rate which is smaller than the first change rate and the opening area is larger than the second opening area, and operates at least some of the slag adhesion prevention devices with a slag adhesion prevention capability lower than the second slag adhesion prevention capability in a case where the change rate is smaller than the second change rate and the opening area is smaller than the first opening area.

4. The blocking prevention device for a gasification melting system according to claim 1,
   wherein the opening part is a throat part of the melting furnace of the gasification melting system,
   wherein the imaging device is disposed at a top of the melting furnace so as to image the throat part from above,
   wherein the plurality of slag adhesion prevention devices includes a secondary combustion chamber air supply device that introduces combustion air into a secondary combustion chamber provided above the throat part of the melting furnace, and a basicity modifier supply device that introduces a basicity modifier into the melting furnace,
   wherein a slag adhesion prevention capability of the secondary combustion chamber air supply device is higher than a predetermined value in a case where an amount of introduction of the combustion air is larger than a predetermined value, and is lower than a predetermined value in a case where the amount of introduction of the combustion air is smaller than a predetermined value,
   wherein a slag adhesion prevention capability of the basicity modifier supply device is high in a case where an amount of introduction of the basicity modifier is large, and is low in a case where the amount of introduction of the basicity modifier is small, and
   wherein a pyrolysis gas duct is provided below the throat part such that the pyrolysis gas becomes an upward flow with respect to the throat part.

5. The blocking prevention device for a gasification melting system according to claim 1,
   wherein the opening part is a slag outlet part of the melting furnace of the gasification melting system,
   wherein the imaging device is installed at a bottom of the melting furnace so as to image the slag outlet part from below,
   wherein the plurality of slag adhesion prevention devices includes a basicity modifier supply device that introduces a basicity modifier into the melting furnace, and a burner device that heats the slag outlet part,
   wherein a slag adhesion prevention capability of the basicity modifier supply device is higher than a predetermined value in a case where an amount of introduction of the basicity modifier is larger than a predetermined value, and is lower than a predetermined value in a case where the amount of introduction of the basicity modifier is smaller than a predetermined value, and
   wherein a slag adhesion prevention capability of the burner device is high in a case where a burner output of the burner device is large and is low in a case where the burner output of the burner device is small.

6. The blocking prevention device for a gasification melting system according to claim 5,
   wherein the calculation unit calculates a weir height of the slag outlet part on the basis of the image, and
   wherein the prevention device control unit changes the slag adhesion prevention capabilities of the plurality of slag adhesion prevention devices on the basis of the weir height.

7. The blocking prevention device for a gasification melting system according to claim 1, further comprising:

a display device,
wherein the control device includes a display control unit that makes the display device display a text or a color corresponding to the opening area or the change rate.

8. A blocking prevention method for a gasification melting system that combusts and melts an object to be treated into a slag in a melting furnace after the object to be treated is converted into pyrolysis gas in a gasification furnace, the blocking prevention method comprising:
an imaging step of imaging an opening part that may be blocked due to adhesion of the slag;
a calculation step of calculating a change rate of an opening area of the opening part, using a plurality of images with different capturing times or a video, captured in the imaging step; and
a slag adhesion prevention step of changing, using a plurality of slag adhesion prevention devices having slag adhesion prevention capabilities for preventing the adhesion of the slag, the slag adhesion prevention capabilities of the respective slag adhesion prevention devices in accordance with the opening area and the change rate
wherein in the slag adhesion prevention step, all the slag adhesion prevention devices are operated with a first slag adhesion prevention capability higher than a predetermined slag adhesion prevention capability, in a case where the change rate is larger than a first change rate and the opening area is smaller than a first opening area, and all the slag adhesion prevention devices are operated with a second slag adhesion prevention capability lower than the predetermined slag adhesion prevention capability, in a case where the change rate is larger than the first change rate and the opening area is larger than a second opening area which is larger than the first opening area.

9. The blocking prevention method for a gasification melting system according to claim 8,
wherein in the slag adhesion prevention step, at least one of the slag adhesion prevention devices is operated with a slag adhesion prevention capability that is lower than the first slag adhesion prevention capability and higher than the second slag adhesion prevention capability, in a case where the change rate is larger than the first change rate and in a case where the opening area is larger than the first opening area and smaller than the second opening area.

10. The blocking prevention method for a gasification melting system according to claim 8,
wherein in the slag adhesion prevention step, at least one of the slag adhesion prevention devices is not operated, in a case where the change rate is smaller than a second change rate which is smaller than the first change rate and the opening area is larger than the second opening area, and at least one of the slag adhesion prevention devices is operated with a slag adhesion prevention capability lower than the second slag adhesion prevention capability, in a case where the change rate is smaller than the second change rate and the opening area is smaller than the first opening area.

11. The blocking prevention method for a gasification melting system according to claim 8,
wherein the opening part is a throat part of the melting furnace of the gasification melting system,
wherein in the imaging step, the throat part is imaged from above,
wherein the plurality of slag adhesion prevention devices is a secondary combustion chamber air supply device that introduces combustion air into a secondary combustion chamber provided above the throat part of the melting furnace, and a basicity modifier supply device that introduces a basicity modifier into the melting furnace,
wherein a slag adhesion prevention capability of the secondary combustion chamber air supply device is high in a case where an amount of introduction of the combustion air is larger than a predetermined value and is lower than a predetermined value in a case where the amount of introduction of the combustion air is smaller than a predetermined value, and
wherein a slag adhesion prevention capability of the basicity modifier supply device is higher than a predetermined value in a case where an amount of introduction of the basicity modifier is larger than a predetermined value, and is lower than a predetermined value in a case where the amount of introduction of the basicity modifier is smaller than a predetermined value.

12. The blocking prevention method for a gasification melting system according to claim 8,
wherein the opening part is a slag outlet part of the melting furnace,
wherein in the imaging step, the slag outlet part is imaged from below,
wherein the plurality of slag adhesion prevention devices is a basicity modifier supply device that introduces a basicity modifier into the melting furnace, and a burner device that heats the slag outlet part,
wherein a slag adhesion prevention capability of the basicity modifier supply device is higher than a predetermined value in a case where an amount of introduction of the basicity modifier is larger than a predetermined value, and is lower than a predetermined value in a case where the amount of introduction of the basicity modifier is smaller than a predetermined value, and
wherein a slag adhesion prevention capability of the burner device is higher than a predetermined value in a case where a burner output of the burner device is larger than a predetermined value and is lower than a predetermined value in a case where the burner output of the burner device is smaller than a predetermined value.

13. The blocking prevention method for a gasification melting system according to claim 12,
wherein in the calculation step, a weir height of the slag outlet part is calculated on the basis of the image, and
wherein in the slag adhesion prevention step, the slag adhesion prevention capabilities of the plurality of slag adhesion prevention devices are changed on the basis of the weir height.

14. The blocking prevention method for a gasification melting system according to claim 8,
wherein in the slag adhesion prevention step, the display device is made to display a text or a color corresponding to the opening area or the change rate.

* * * * *